(12) United States Patent
Koo et al.

(10) Patent No.: US 9,953,176 B2
(45) Date of Patent: Apr. 24, 2018

(54) METHOD AND SYSTEM FOR ANONYMIZING ACTIVITY RECORDS

(71) Applicant: Dtex Systems Inc., San Jose, CA (US)

(72) Inventors: Rajan Peng Kiat Koo, San Jose, CA (US); Russell Alan Bruechert, Hoddesdon (GB); Roderick Duncan Stamp, Beaconsfield (GB); Arun Narasimha Swami, Cupertino, CA (US); Vamsi Krishna Akkineni, Fremont, CA (US)

(73) Assignee: Dtex Systems Inc., San Jose, CA (US)

( * ) Notice: Subject to any disclaimer, the term of this patent is extended or adjusted under 35 U.S.C. 154(b) by 0 days.

(21) Appl. No.: 14/874,265

(22) Filed: Oct. 2, 2015

(65) Prior Publication Data

US 2017/0098093 A1    Apr. 6, 2017

(51) Int. Cl.
*H04L 29/06* (2006.01)
*G06F 21/00* (2013.01)
*G06F 7/04* (2006.01)
*G06F 21/62* (2013.01)
*G06F 21/55* (2013.01)

(52) U.S. Cl.
CPC ........ *G06F 21/6209* (2013.01); *G06F 21/554* (2013.01)

(58) Field of Classification Search
CPC ........................... G06F 21/6209; G06F 21/554
USPC ................................ 726/23, 4; 713/165, 182
See application file for complete search history.

(56) References Cited

U.S. PATENT DOCUMENTS

| | | | |
|---|---|---|---|
| 9,195,703 B1* | 11/2015 | Kirmse | G06Q 10/02 |
| 2004/0143738 A1* | 7/2004 | Savage | G06Q 20/383 |
| | | | 713/168 |
| 2009/0077163 A1* | 3/2009 | Ertugrul | G06Q 30/0273 |
| | | | 709/203 |
| 2009/0132419 A1 | 5/2009 | Grammer et al. | |
| 2009/0132575 A1 | 5/2009 | Kroeschel et al. | |
| 2011/0063672 A1 | 3/2011 | Sugimoto | |
| 2014/0063237 A1* | 3/2014 | Stone | H04N 7/181 |
| | | | 348/143 |

(Continued)

OTHER PUBLICATIONS

International Search Report issued in corresponding International Application No. PCT/US2016/054678, dated Nov. 21, 2016 (5 pages).

(Continued)

*Primary Examiner* — Aravind K Moorthy
(74) *Attorney, Agent, or Firm* — Osha Liang LLP

(57) ABSTRACT

A method for processing activity records. The method includes obtaining an activity record, and generating an anonymization dictionary. Generating the anonymization dictionary includes detecting, in the activity record, a set of target entities to be anonymized, making a determination that a resource is associated with a subset of the target entities of the set of target entities, and after making the determination, assigning an anonymized identity to the subset of target entities, and generating an anonymization identifier for each target entity in the subset of target entities to obtain a set of anonymization identifiers, each including the anonymized identity. The method further includes processing the activity record using the anonymization dictionary to obtain an anonymized activity record and storing the anonymized activity record.

24 Claims, 9 Drawing Sheets

(56) References Cited

U.S. PATENT DOCUMENTS

| | | | |
|---|---|---|---|
| 2014/0215607 A1 | 7/2014 | Horne et al. | |
| 2015/0128287 A1* | 5/2015 | LaFever | G06F 21/6254 |
| | | | 726/27 |
| 2016/0344702 A1* | 11/2016 | Ukena | G06F 21/6245 |
| 2017/0032147 A1* | 2/2017 | Denner | G06F 21/6263 |

OTHER PUBLICATIONS

Written Opinion issued in corresponding International Application No. PCT/US2016/054678, dated Nov. 21, 2016 (8 pages).

* cited by examiner

Sample Activity Record (pre-anonymization)

1.9.5,Windows,1542202,1,25,22,0,0,0,04 Mar 2015 13:47:57:000,2015-03-04T13:47:57.000Z,File Move,144,,0,04 Mar 2015 13:47:57:000,2015-03-04T13:47:57.000Z,txt,C:\Users\mark.thawley\AppData\Roaming\Mozilla\Firefox\Profiles\y64fe2z0.default\extensions\trash\pavel.sherbakov@ggmmaaiill.com\chrome\content\data\,sd_dials,C:\Users\,C:\,,C:\Program Files (x86)\Mozilla Firefox\,firefox.exe,74798,265178,0,,0,txt,C:\Users\mark.thawley\AppData\Roaming\Mozilla\Firefox\Profiles\y64fe2z0.default\extensions\pavel.sherbakov@ggmmaaiill.com\chrome\content\data\,sd_dials,C:\Users\,C:\,,0,,,,File System Activities,DSL\WIN81RS,12,4f6f8896-b796-e045-b730-58fda8765e94,192.168.1.20,Microsoft Windows 8,1,26,64 bit,0,27 Feb 2015 09:32:34:897,2015-02-27T09:32:34.897.000Z,16 Dec 2014 14:14:00:000,2014-12-16T14:14:00.000Z,01 Jan 1900 00:00:00:000,1900-01-01T00:00:00.000Z,1,Default,dsl\mark.thawley,7,e9900913-61fc-3e8c-ae92-690c5414b1ec,

Anonymization

Sample Anonymized Activity Record

1.9.5,Windows,1542202,1,25,22,0,0,0,04 Mar 2015 13:47:57:000,2015-03-04T13:47:57.000Z,File Move,144,,0,04 Mar 2015 13:47:57:000,2015-03-04T13:47:57.000Z,txt,C:\Users\[}1-USER-9{]\AppData\Roaming\Mozilla\Firefox\Profiles\y64fe2z0.default\extensions\trash\[}1-EMAIL-5{]@ggmmaaiill.com\chrome\content\data\,sd_dials,C:\Users\,C:\,,C:\Program Files (x86)\Mozilla Firefox\,firefox.exe,74798,265178,0,,0,txt,C:\Users\[}1-USER-9{]\AppData\Roaming\Mozilla\Firefox\Profiles\y64fe2z0.default\extensions\[}1-EMAIL-5{]@ggmmaaiill.com\chrome\content\data\,sd_dials,C:\Users\,C:\,,0,,,,File System Activities,[}1-DOMAIN-6{],12,4f6f8896-b796-e045-b730-58fda8765e94,[}1-AIP-2{],Microsoft Windows 8,1,26,64 bit,0,27 Feb 2015 09:32:34:897,2015-02-27T09:32:34.897.000Z,16 Dec 2014 14:14:00:000,2014-12-16T14:14:00.000Z,01 Jan 1900 00:00:00:000,1900-01-01T00:00:00.000Z,1,Default,dsl\[}1-USER-9{],7,e9900913-61fc-3e8c-ae92-690c5414b1ec,

FIG. 4

METHOD AND SYSTEM FOR ANONYMIZING ACTIVITY RECORDS

BACKGROUND

Activity on a company's computing devices may be tracked in order to detect behaviors that may pose threats.

SUMMARY

In general, in one aspect, the invention relates to a method for processing activity records. The method includes obtaining an activity record, and generating an anonymization dictionary. Generating the anonymization dictionary includes detecting, in the activity record, a set of target entities to be anonymized, making a determination that a resource is associated with a subset of the target entities of the set of target entities, and after making the determination, assigning an anonymized identity to the subset of target entities, and generating an anonymization identifier for each target entity in the subset of target entities to obtain a set of anonymization identifiers, each including the anonymized identity. The method further includes processing the activity record using the anonymization dictionary to obtain an anonymized activity record and storing the anonymized activity record.

In general, in one aspect, the invention relates to a method for processing activity records. The method includes obtaining an activity record, and generating an anonymization dictionary. Generating the anonymization dictionary includes detecting, in the activity record, a set of target entities to be anonymized, assigning an anonymized identity to each unique target entity of the set of target entities, and generating dictionary entries for the set of target entities. Each dictionary entry includes a target entity and a corresponding anonymized identifier including the anonymized identity for the target entity. The method further includes generating an equivalence map. Generating the equivalence map includes making a determination that a resource is associated with a subset of the target entities of the set of target entities and storing, in the equivalence map, an identity relationship specifying that the subset of the target entities is associated with the resource. The method also includes processing the activity record using the anonymization dictionary to obtain an anonymized activity record and storing the anonymized record.

In general, in one aspect, the invention relates to a system for processing activity records. The system includes an anonymization engine programmed to obtain an activity record, and generate an anonymization dictionary. Generating the anonymization dictionary includes detecting, in the activity record, a set of target entities to anonymize, making a determination that a resource is associated with a subset of the target entities of the set of target entities, and assigning an anonymized identifier to the subset of target entities. The anonymization engine is further programmed to process the activity record using the anonymization dictionary to obtain an anonymized activity record. The system also includes a repository configured to store the anonymized activity record.

In general, in one aspect, the invention relates to a system for processing activity records. The system includes an anonymization engine programmed to obtain an activity record, and generate an anonymization dictionary. Generating the anonymization dictionary includes detecting in the activity record, a set of target entities to be anonymized, assigning an anonymized identity to each unique target entity of the set of target entities, and generating dictionary entries for the set of target entities. Each dictionary entry includes a target entity and a corresponding anonymized identifier including the anonymized identity for the target entity. The anonymization engine is further programmed to generate an equivalence map. Generating the equivalence map comprises making a determination that a resource is associated with a subset of the target entities of the set of target entities, and storing, in the equivalence map, an identity relationship specifying that the subset of the target entities is associated with the resource. Generating the equivalence map further comprises processing the activity record using the anonymization dictionary to obtain an anonymized activity record. The system also includes a repository configured to store the anonymized activity record.

In general, in one aspect, the invention relates to a method for processing activity records. The method includes obtaining a set of activity records, providing at least one of the set of activity records to each of a set of workers, receiving, from each of the set of workers, a set of target entities, generating, using the sets of target entities, an anonymization dictionary, providing a copy of the anonymization dictionary to each of the set of workers, receiving, from each of the set of workers, at least one anonymized activity record generated using the copy of the anonymization dictionary, and storing the anonymized activity records.

In general, in one aspect, the invention relates to a method for processing activity records. The method includes obtaining a first set of anonymized activity records and a first local anonymization dictionary from a first endpoint agent, and obtaining a second set of anonymized activity records and a second local anonymization dictionary from a second endpoint agent. The method further includes storing the first set of anonymized activity records, the first local anonymization dictionary, the second set of anonymized activity records, and the second local anonymization dictionary, and performing a threat analysis using the first set of anonymized activity records, the first local anonymization dictionary, the second set of anonymized activity records, and the second local anonymization dictionary.

Other aspects of the invention will be apparent from the following description and the appended claims.

BRIEF DESCRIPTION OF DRAWINGS

FIG. 4 shows a sample activity record and an anonymized sample activity record in accordance with one or more embodiments of the invention.

DETAILED DESCRIPTION

Figure 1A:
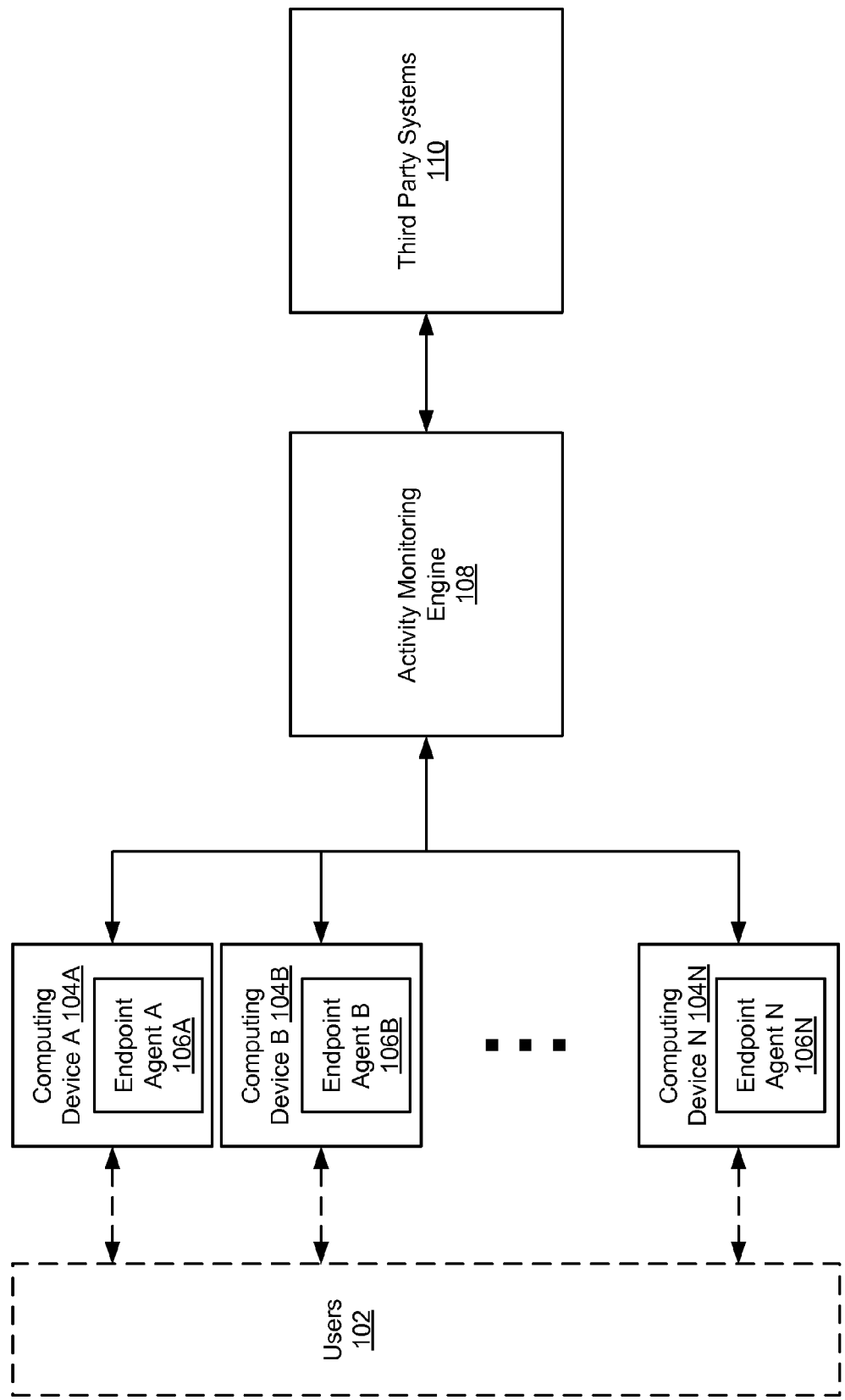
FIGS. 1A-1D show systems in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to methods and systems for anonymizing activity records. In one or more embodiments of the invention, systems used for the detection of cyber-threats, including company-internal and external threats, may obtain activity records for the purposes of performing threat analysis. Company-internal threats may be caused, for example, by employees of the company performing unauthorized operations using computing devices of the company. For example, employees (or, in general, users operating company-owned and/or company-operated computing devices) may, without proper authorization, access sensitive information and may copy and distribute the sensitive information, they may access illegal or unethical content on web pages, etc. Company-external threats may be cyber-attacks targeting company-owned resources such as computing devices, network infrastructure, data storage, etc. Methods and systems for the detection of cyber-threats, in accordance with one or more embodiments of the invention, may be used to identify such threats and/or potential threats, and to trigger alerts. In one or more embodiments of the invention, activity is logged by the company's computing devices. The resulting activity records may be analyzed for activities that may indicate threats.

The analysis of the activity records may be automated or partially automated and may be performed, for example, by threat analysis algorithms that parse the activity records for indications of activities that may pose a threat. The threat analysis algorithms may issue an alert(s), if unsafe activities are found. In one or more embodiments of the invention, an anonymization of the activity records is performed. More specifically, the activity records may be anonymized such that threat analysis may be performed even though the activity record may not allow the identification of a resource (e.g., a human resource, i.e., a user, or any other type of resource, including domain names, IP addresses, port numbers, host names, etc.) affiliated with an activity documented in the activity records. Further, in the event that the identity of the resource is required, the resource may be identified by an authorized viewer of the activity records. Authorized viewers may be, for example, employee supervisors, employees of the human resources department, company-internal and/or external security analysts, etc. Depending on the level of authorization, an authorized viewer may review the fully de-anonymized (i.e., original) activity records, or activity records that remain anonymized to various, configurable, degrees.

When a threat alert is issued by the threat analysis algorithms based on detected unsafe activity, a supervisor may be notified. The supervisor may access the anonymized activity record for a review of the activities that triggered the threat alert. Depending on the privileges of the supervisor, the activity record may be partially or fully de-anonymized, allowing the supervisor to assess the threat potential of the activities.

Anonymization of activity records may be used to protect the identities of resources including user's identities but also company-related information, such as, for example, company-internally used domain names and IP addresses. Such company-internal information may need to be anonymized, for example, in cases where activity records are shared with $3^{rd}$ parties in order to avoid unintentional disclosure of company-internal information such as IT infrastructure details. Anonymized activity records may be shared with external $3^{rd}$ parties, for example, in cases where a threat analysis is performed externally, e.g. by a service provider offering threat monitoring and analysis. Further, anonymized activity records may be shared with external developers of threat detection algorithms and/or anonymization algorithms.

FIG. 1A shows a system in accordance with one or more embodiments of the invention. The system may include one or more users (102) that may interact with computing devices A-N (104A-104N). Each computing device (104A-104N) may host an endpoint agent (106A-106N) that may generate activity records, based on a user's interaction with the computing device. The system in accordance with one or more embodiments of the invention further includes an activity monitoring engine (108) that may analyze activity records received from the endpoint agents A-N (106A-106N) for threats, as further described below, with reference to FIG. 1B and FIGS. 2A, 2B, 3A and 3B. The system in accordance with one or more embodiments of the invention may also include third party systems (110) that may contribute to the threat detection and analysis as further described below. Each of these components is described below.

In one or more embodiments of the invention, users (102) operate one or more of the computing devices A-N (104A-104N). The users may have user accounts that may, for example, grant access to certain resources such as content stored on connected company servers, software applications, etc. User accounts may be personalized based on the needs of the users. For example, a design engineer may have access to technical design resources such as mechanical parts libraries, while not being allowed to access sales data, whereas an employee of the human resources department may have access to personnel data while not being allowed to access technical design resources and sales data.

The computing devices (104A-104N) may be used by the users (102) to perform work-related tasks. The computing devices may, however, also be abused, for example, by users accessing data in an unauthorized manner, bypassing security measures, using pirated applications and/or media, copying sensitive information on external, removable storage media, etc. In addition, the computing devices may face company-external threats, caused, for example, by hacking attacks, and malware. A computing device (104A-104N) may be, for example, a mobile device (e.g., a laptop computer, smart phone, personal digital assistant, tablet computer, or other mobile device), a desktop computer, server, blade in a server chassis, or any other type of computing device or devices that includes at least the minimum processing power, memory, and input and output device(s) to perform one or more embodiments of the invention. A computing device may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities, such as input and output device enabling a user to interact with the computing device. The computing device may further be connected to a network (e.g., the company's local area network (LAN), a wide area network (WAN) such as the Internet, mobile networks, or any other type of network via a network interface connection.

In one or more embodiments of the invention, each of the computing devices (104A-104N) hosts an endpoint agent (106A-106N). An endpoint agent may be used to monitor activity on the computing device hosting the endpoint agent, thereby creating an activity record that documents the activity. Activity records may document activity with a configurable level of detail. For example, a activity record may document one or more of the following metadata: the date and time an application window is opened, the name of the application being used by the user, information in the title bar of the application, a configurable amount of content in the application window, the user account used to access the application, the file system path in which content was stored, the file system path to which content was stored, data being accessed, information being transferred via a network connection, etc. Accordingly, an activity record may be a string or a series of strings that includes metadata that documents user activities (see e.g. FIG. 4). The endpoint agent (106A-106N) may be operationally connected to the activity monitoring engine (108). For example, the activity monitoring engine (108), which may execute on a company-owned and/or operated server, may be connected to the computing device (104A-104N) via a computer network, e.g. a local area network (LAN), thus enabling the endpoint agent (106A-106N) to provide activity records to the activity monitoring engine (108) for threat detection and analysis. In one or more embodiments of the invention, an endpoint agent (106A-106N) may be software, executing, for example, as a background process on a computing device (104A-104N) or a combination of software and hardware capable of performing the above tasks.

In one or more embodiments of the invention, activity monitoring engine, described in detail below with reference to FIG. 1B, may obtain activity records from the computing devices A-N (104A-104N) and may analyze the activity records for activities, such as user behavior, that may pose threats. In one or more embodiments of the invention, the activity monitoring engine (108) performs an anonymization of the activity records. The anonymization may be performed in a manner that protects resources' identities without impairing threat detection, as further described in detail below with reference to FIGS. 1B, 2A, 2B, 3A and 3B. In one or more embodiments of the invention, the activity monitoring engine may be software or a set of software modules, executing on a computing device (not shown), e.g., a server, that is operatively connected to the endpoint agents (106A-106N), e.g., via a computer network connecting the server to computing devices A-N (104A-104N), thus enabling the activity monitoring engine to obtain activity records from the endpoint agents. The computing device that hosts the activity monitoring engine (108) may be a company-owned and/or operated physical or virtual server, that may be part of the company's IT infrastructure, or it may be a $3^{rd}$ party physical or virtual server located off-premises, e.g., a cloud-based or remotely located server that may be owned and operated by a $3^{rd}$ party, for example, by a $3^{rd}$ party providing threat detection as a service. In one embodiment of the invention, software modules of the activity monitoring engine (108) may be implemented in a distributed manner, as further described in detail below, with reference to FIG. 1B.

Continuing with the discussion of FIG. 1A, in one embodiment of the invention, the system further includes third party systems (110). The third party systems may be, for example, services that provide anonymization, threat detection and threat analysis, as further described in detail below, with reference to FIGS. 1B, 2 and 3. The third party systems may be provided by a companies offering threat detection as a service. Further, third party systems may be platforms and/or marketplaces for the development and sharing of threat analysis and detection algorithms and/or anonymization engines performing anonymization of activity records. Accordingly, the third party systems (110) may interface with the activity monitoring engine. If activity records are shared with a third party system, the shared activity records may be anonymized in accordance with one or more embodiments of the invention, prior to sharing the activity records, in order to avoid revealing resource identities and/or company-internal information, as further described in detail below.

Figure 1B:
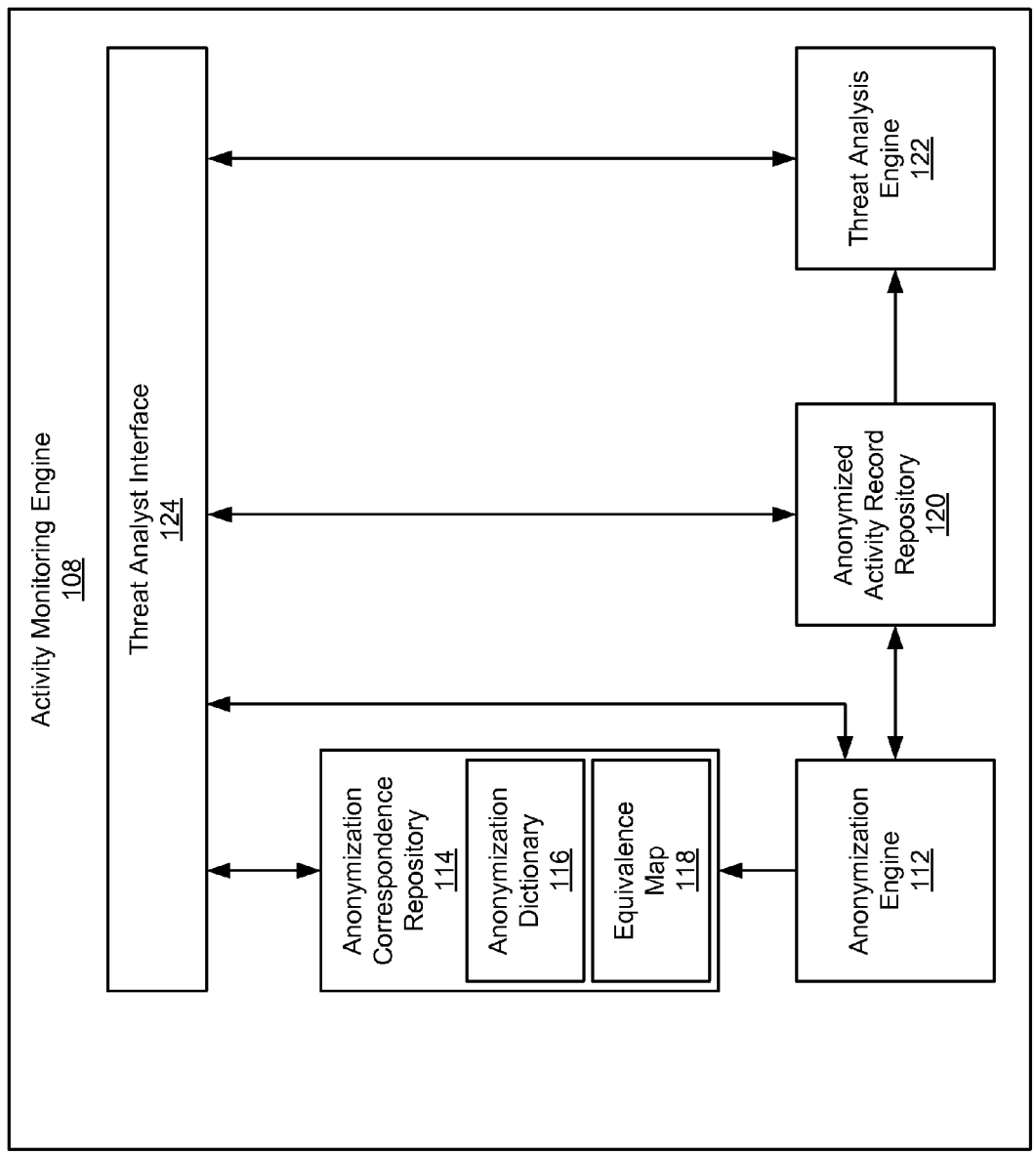

FIG. 1B shows an activity monitoring engine in accordance with one or more embodiments of the invention. The activity monitoring engine (108) may include an anonymization engine (112), an anonymization correspondence repository (114), an anonymized activity record repository (120), a threat analysis engine (122) and a threat analyst interface (124). Each of these components is described below.

The anonymization engine (112), in accordance with one or more embodiments of the invention, anonymizes the activity records obtained from the endpoint agents A-N (106A-106N) and writes the anonymized activity records to the anonymized activity record repository (120). The anonymization engine (112) may perform the anonymization based on entries in the anonymization correspondence repository (114), as further described below with reference to FIGS. 1C and 1D, 2A, 2B, 3A and 3B. In one or more embodiments of the invention, the anonymization engine (112) may be software designed to perform at least some of the steps of the methods described in FIGS. 2A, 2B, 3A and 3B. In one embodiment of the invention, the anonymization engine may be executing on a single computing device, e.g., a server, that is operatively connected to the endpoint agents (106A-106N) (e.g. via a computer network connecting the server to computing devices A-N (104A-104N), thus enabling the activity monitoring engine to obtain activity records from the endpoint agents. Alternatively, the anonymization engine may be a distributed system, where the anonymization is performed by separate workers, i.e., separate computing devices. The workers may be, for example, the computing devices A-N (104A-104). In such a scenario, a version of the anonymization engine that is configured for distributed anonymization of activity records may be included in the endpoint agents (106A-106N) hosted by the computing devices A-N (104A-104N). Alternatively, the workers may be cloud based, e.g., being hosted by Amazon Web Services®, or they may be provided by a 3$^{rd}$ party performing threat detection as a service.

In another embodiment of the invention, the anonymization may be performed locally by the endpoint agents or by an associated process executing on the same computing devices on which the endpoint agents are executing. In such scenarios, the endpoint agents (or an associated process) may perform methods shown in FIGS. 2A-3B and then provide the resulting anonymized activity records along with a local anonymization dictionary (and, if present, a local equivalence map) to the activity monitoring engine. The activity monitoring engine may then store activity records, the local anonymization dictionary, and, if present, the local equivalence map.

Further, in one embodiment of the invention, multiple anonymization engines, and/or a single anonymization engine with multiple anonymization stages may be employed by the system, for example, in order to obtain different degrees of anonymization. The anonymization engines or stages of an anonymization engine may be connected serially, thereby incrementally increasing the degree of anonymization of an activity record as the activity record is sequentially processed by the various anonymization engines or stages. Alternatively, the anonymization engines or stages of an anonymization engine may operate in parallel on an activity record, with each anonymization engine or stage performing anonymization of the activity record to a different degree. The details of performing the anonymization of activity records are provided below, with reference to FIGS. 2A, 2B, 3A and 3B.

In one or more embodiments of the invention, the anonymization engine (112) relies on an anonymization correspondence repository (114) in order to anonymize activity records. The anonymization correspondence repository may further be used to de-anonymize a previously anonymized activity record. Anonymization and de-anonymization using the anonymization correspondence repository (114) may be based on entries in an anonymization dictionary (116) and/or and equivalence map (118) included in the anonymization correspondence repository. The anonymization dictionary (116) may establish a relationship between a target entity (i.e., a resource-related term to be anonymized), and an anonymized identifier. The anonymization engine may query the anonymization dictionary, for example, when it incurs a target entity during the anonymization of an activity record. If an anonymization dictionary entry exists for the target entity, the anonymization engine may replace the target entity in the activity record to be anonymized with the corresponding anonymized identifier. If an anonymization dictionary entry does not exist for the target entity, the anonymization engine may add the target entity along with an anonymized identifier to the anonymization dictionary. In one embodiment of the invention, the anonymization dictionary is an access-protected database, i.e., the anonymization dictionary may only be accessed by authorized users, thereby ensuring that resource identities in anonymized activity records can only be reconstructed by users authorized to view a de-anonymized version of the anonymized activity record. Such a user may be, for example, a security analyst authorized by the human resources department. The database used for the anonymization dictionary may be implemented using any format suitable for the storage of entries that establish a correspondence between target entities and anonymized identifiers. The database may be, for example, a text file, a spreadsheet, an SQL database, etc. The anonymization dictionary may be stored in non-volatile or volatile memory, e.g. on a hard disk drive or in RAM.

Embodiments of the invention may further include an equivalence map (118). The equivalence map, described in detail below with reference to FIG. 1D, may define relationships between entries in the anonymization dictionary, for example, based on affiliation with the same identity (e.g. a user or a company) being responsible for multiple entries in the anonymization dictionary. Alternatively, an equivalence map may not be used if relationships between entries are not detected and/or considered by the anonymization engine, or if the relationships between entries are established within the anonymization dictionary (116), as described in detail below with reference to FIG. 1C. The equivalence map may be a database that may or may not be access-protected. The database used for the equivalence map may be implemented using any format suitable for the storage of entries that establish a correspondence between related entries in the anonymization dictionary. The database may be, for example, a text file, a spreadsheet, an SQL database, etc. The database used for the equivalence map may be the database that is also used for the anonymization dictionary, or it may be a separate database. The equivalence may be stored in non-volatile or volatile memory, e.g. on a hard disk drive or in RAM. In one embodiment of the invention, the anonymization correspondence repository (114) is stored in a central location, e.g. on the server executing the anonymization engine. Further, copies of the anonymization correspondence repository or additional anonymization correspondence repository derived from and/or synchronized to the anonymization correspondence repository may be stored on other computing devices, for example in cases where multiple anonymization engines or stages of an anonymization engine are used to perform a distributed anonymization. Additional details regarding the anonymization correspondence repository (114) are described below, with reference to FIGS. 1C and 1D.

In one or more embodiments of the invention, anonymized activity records, generated by the anonymization engine, are stored in the anonymized activity record repository (120). The anonymized activity record repository may include only a set of recently anonymized activity records, or it may include a cumulative history of anonymized activity records obtained over a prolonged period of time. In one embodiment of the invention, the anonymized activity record repository receives all anonymized activity records generated by the anonymization engine. Alternatively, multiple anonymized activity record repositories may exist, where anonymized user activity records are stored in a particular activity record repository, depending on the origin of the activity records. For example, an activity record repository may only store anonymized activity records originating in a particular corporate division. In one embodiment of the invention, multiple anonymized activity record repositories are employed in order to store activity records that have been anonymized to different degrees. For example, one anonymized activity record repository may store anonymized activity records, where only user names have been anonymized, whereas a separate anonymized activity record repository may store anonymized activity records where any type of company resource-related information has been anonymized. Depending on the degree of anonymization, the anonymized activity record repositories may be access protected to various degrees. For example, an anonymized activity record repository that includes activity records where only the user names have been anonymized may be accessible by a limited group of authorized viewers only, thus requiring strong access protection, whereas an anonymized activity record repository that contains activity records where all company resource-related information has been anonymized may be accessible by a larger group of authorized viewers, and therefore may require only basic access protection. In one embodiment of the invention, anonymized activity records or entire or partial anonymized activity record repositories may be shared with $3^{rd}$ parties, e.g. $3^{rd}$ parties that perform threat analysis and/or developers of threat analysis algorithms and/or anonymization engines. In such cases, most or all company resource-related information may have been anonymized to avoid inadvertent disclosure of sensitive information.

In one embodiment of the invention, the anonymized activity record repository may be implemented using any format suitable for the storage of activity records. The activity record repository may be, for example, a text file, a spreadsheet, an SQL database, etc. In one or more embodiments of the invention, the activity record repository is stored in a central location, e.g., on the server executing the anonymization engine. Further, an activity record repository may be stored remotely, for example in a cloud storage.

In one or more embodiments of the invention, the threat analysis engine may obtain anonymized activity records from the anonymized activity record repository (120) and analyze the obtained anonymized activity records for potential threats. In one embodiment of the invention, the threat analysis engine may, if present, perform threat analysis using at least a portion of the equivalence map. In one embodiment of the invention, the threat analysis engine uses threat detection algorithms to determine whether an anonymized activity record includes indications of threats. The threat detection algorithm may evaluate activities stored in the anonymized activity records, and if an abnormal activity is detected, the threat detection algorithm may issue an alert. The threat detection algorithm may further quantify the risk resulting from abnormal activities. A high risk score may indicate an elevated risk thus warranting an alert, whereas a lower score may not necessarily trigger an immediate alert. The detection of abnormal activities may be based on a comparison with typical, i.e. expected activities. For example, a user activity stored in an activity record may be compared to typical behavior of a user, as per the user's role in the company. Examples for abnormal user behavior incompatible with the user's role include an engineer copying a customer list to an external storage device, a salesman copying confidential engineering records to an external storage device, etc. Alternatively, or additionally, the detection of abnormal user behavior may be based on a comparison with historical user behavior and/or data from known previous insider-threat cases. For example, a company's employee that primarily relied on the Internet to research suppliers' products but that recently started to use the Internet in order to contact direct competitors of the company may also be considered suspicious. Further, the threat detection may compare resource activity stored in an activity record with historical and/or typical resource activity. For example, a sustained access to a hard drive may be considered suspicious if the accessed hard drive has historically been mostly idle. Other methods for performing threat detection may be performed by the threat analysis engine without departing from the invention. Threat detection may, for example, in addition involve a human operator, e.g., a security expert, performing manual threat detection, and/or a manual review of threats detected by the threat analysis engine.

The threat analysis engine may include one or more application programming interfaces (APIs) to permit interaction with the third party systems (110), for example, to share anonymized activity records with $3^{rd}$ parties, to access threat analysis algorithms and/or anonymization engines developed by $3^{rd}$ parties, download them, and potentially set them up to replace currently used algorithms.

The threat analysis engine (122) may be executing on a single computing device, e.g., on the server that also executes the anonymization engine. In other implementations, the threat analysis engine may be executing on a separate computing device, either locally or remotely, e.g. hosted on a cloud server. Further, multiple threat analysis engines may be used to perform a distributed threat analysis.

In one or more embodiments of the invention the threat analyst interface may serve as a user interface providing access to various functions of the system for the detection of cyber-threats. The threat analyst interface may, for example, display alerts triggered by detected threats or potential threats. The threat analyst interface may further display threat-related information, which may, for example, also include the anonymized activity record that triggered the threat alert. The threat analyst interface may further include configurable filters that allow selective displaying of threats, potential threats, and threat-related information. For example, a filter may be used to display only threat-related information related to activities of a particular user, or a group of users. In addition, a filter may be configured to suppress alerts for abnormal activities where the risk score, computed by the threat analysis engine, does not exceed a set threshold. In one embodiment of the invention, the threat analyst interface may further display de-anonymized or partially de-anonymized versions of anonymized activity records. The amount of de-anonymization may depend on the operator's level of authorization, and may range from complete de-anonymization, for an operator that is fully authorized to view sensitive user data to no de-anonymization if the operator is only equipped with basic viewing privileges.

In one embodiment of the invention, the threat analyst interface (124) may further be used to configure various components of the activity monitoring engine (108). The threat analyst interface may be used, for example, to parameterize the anonymization engine (112) and the threat analysis engine (122). For example, the threat analyst interface may be used to configure the degree of anonymization performed by the anonymization engine (112), and/or to select and parameterize a particular threat detection algorithm to be used by the threat analysis engine (122). In addition, the threat analyst interface (124) may provide access to the anonymization correspondence repository (114), allowing the viewing and editing of anonymization correspondence repository content.

In one or more embodiments of the invention, the threat analyst interface (124) is a graphical user interface (GUI), that is operatively connected to the anonymization engine (112) and the threat analysis engine (122), and that may further be operatively connected to the anonymization correspondence repository (114) and the anonymized activity record repository (120). The threat analyst interface (124) may execute on any computing device that provides the input and output interfaces necessary for an operator to interact with the threat analyst interface. A suitable computing device may be, for example, a desktop computer, a server, or a mobile device (e.g., a laptop computer, smart phone, personal digital assistant, tablet computer, or other mobile device).

Figure 1C:
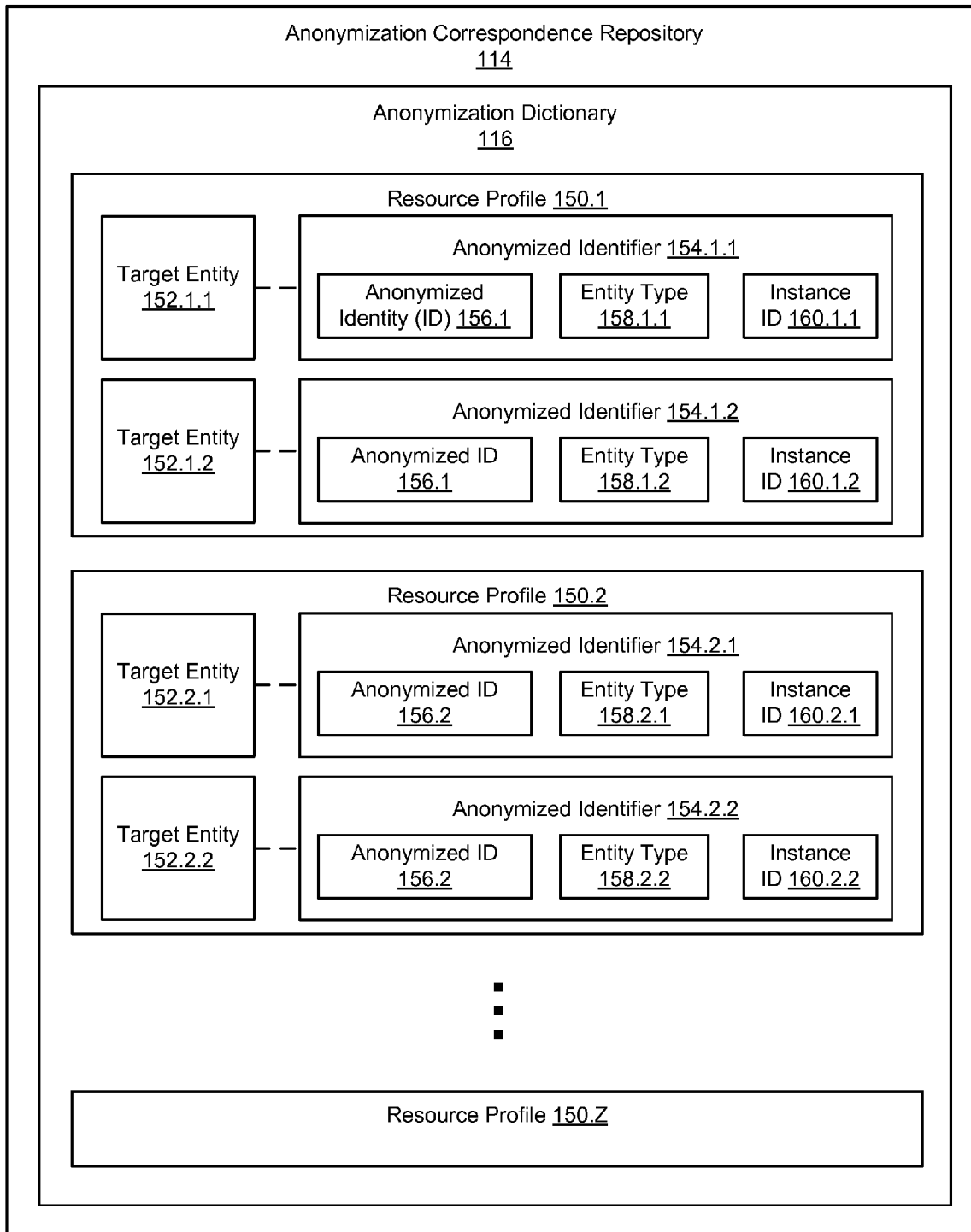

FIG. 1C shows an anonymization correspondence repository (114) in accordance with one or more embodiments of the invention. The anonymization correspondence repository includes an anonymization dictionary (116). The anonymization dictionary (116) includes resource profiles (150.1-150.Z). Resource profiles may be used to structure information that may be attributed to a particular resource, e.g., a particular user or a particular company. For example, a user may be a resource that has multiple email addresses for which the anonymization dictionary includes entries under the same resource profile, and/or a company may have multiple resources such as IP addresses, domain names, etc., for which the anonymization dictionary includes entries under the same resource profile. Separate resource profiles may therefore exist as necessary to group resources. Each resource profile may include entries, each entry including a target entity (152.1.1-152.2.2) and a corresponding anonymized identifier (154.1.1-154.2.2). An anonymized identifier (154.1.1-154.2.2) may include an anonymized identity (ID) (156.1, 156.2), an entity type (158.1.1-158.2.2) and instance ID (160.1.1-160.2.2). Each of these elements is described below. Target entity identifiers and corresponding anonymized identifiers where an affiliation with a particular resource profile is unknown may exist in the dictionary without being grouped under a common resource profile.

The pairs of target entity and anonymized identifier in the anonymization dictionary (116) may store information used for the anonymization and de-anonymization of activity records by establishing a relationship between the target entities (152.1.1-152.2.2) in the activity records to be anonymized, and the anonymized identifiers (154.1.1-154.2.2) used to replace the target entities during the anonymization of the activity records. A target entity may be a term in the activity record that may reveal the identity of the resource associated with the target entity or that may reveal sensitive company information (i.e., sensitive information about the company (or legal entity) with which the resource is associated), and which therefore may need to be anonymized in order to protect the resource's identity and/or protect sensitive company information. A target entity may be, for example, a user name, a login name, an email address, a company name, a partner name, an IP address, a domain name, a host name, etc. The anonymized identifier may be a descriptor that does not allow the identification of the resource or sensitive company information without looking up the relationship of anonymized identifier and target entity in the anonymization dictionary. The anonymized identifier may include an anonymized identity (ID) (156.1, 156.2), an entity type (158.1.1-158.2.2) and an instance ID (160.1.1-160.2.2). A unique anonymized ID (156.1, 156.2), specific to a resource profile, may be, for example, any type of string, a number, symbols, or any combination thereof. The anonymized ID may be randomly or systematically selected. For example, user identifiers used in the dictionary may be "USER1" "USER2" USER3" etc., or "000" "001" "002", etc.

In one or more embodiments of the invention, an anonymized identifier (154.1.1-154.2.2) may further include an entity type (158.1.1-158.2.2) to classify the target entity. Classifications may include, for example, "user name", "email address", "company name", "domain name", "host name", "IP address", and "other" for other selected strings deemed sensitive data.

In one or more embodiments of the invention, the anonymization dictionary may include multiple target entities with the same entity type. Consider a scenario, where user John Smith uses the email accounts "j.smith@gmail.com", "john_smith@yahoo.com" and "john.smith@company.com". Each one of these email addresses, if stored in an activity record, may be detected as a target entity by the anonymization engine. Accordingly, the anonymization dictionary may include three entries for the three email addresses of user "John Smith". All three target entities are of the entity type "email address". Further, all three entries are organized in a single resource profile because they are affiliated with the same resource (user "John Smith").

Multiple entries having the same entity type may therefore be created under the same resource profile in the anonymization dictionary. To distinguish these anonymized identifiers, each of the anonymized identifiers (154.1.1-154.2.2) may include an instance ID (160.1.1-160.2.2). In the above example, an instance ID "1" may be used for the entry created for the target entity "j.smith@gmail.com", and instance ID "2" may be used for the entry created for target entity "john_smith@yahoo.com", etc. Instance IDs may be unique within a resource profile, or they may be globally unique within the anonymization dictionary, thus allowing distinction of anonymized identifiers within a resource profile. In one embodiment of the invention, the instance ID may be included in the anonymized ID (156.1-156.2). In this case, the anonymized identifier (154.1.1-154.2.2) may not include a separate entry dedicated to the instance ID.

Figure 1D:
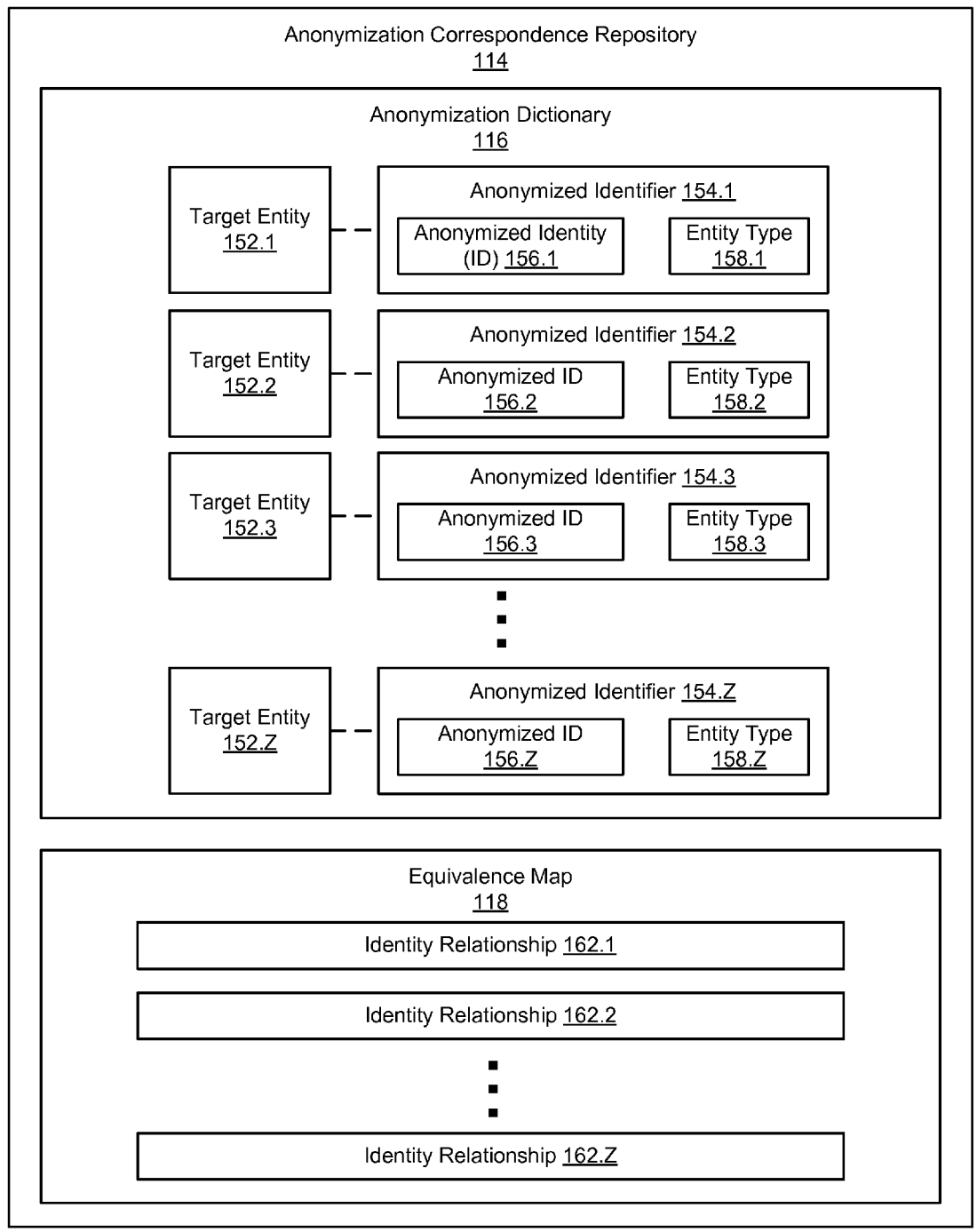

In an alternative embodiment, anonymization dictionary entries, i.e., pairs of target entities and anonymized identifiers are not grouped in resource profiles. Accordingly, the anonymization dictionary entries in the anonymization dictionary may not be structured based on resources responsible for the generation of these entries. FIG. 1D shows an anonymization correspondence repository (114) in accordance with an embodiment of the invention, where the anonymization dictionary (116) does not structure entries based on resource profile affiliation. Instead, an equivalence map (118), included in the anonymization correspondence repository, is used to establish relationships between entries in the anonymization dictionary (116). In one embodiment of the invention, the equivalence map (118), but not the anonymization dictionary (116), may be shared with the threat analysis engine (122) in order to enable the threat analysis engine (122) to exploit relationships between anonymized identifiers (i.e., the fact that certain anonymized identifiers may be related to the same resource) to improve threat detection performance.

The anonymization dictionary (116), shown in FIG. 1D, includes entries similar to the entries described above with reference to FIG. 1C. The entries, however, are not structured based on resource profile affiliation. An entry includes a target entity (152.1-152.Z) and a corresponding anonymized identifier (154.1-154.Z), as previously described with reference to FIG. 1C. Further, an anonymized identifier includes an anonymized identity (156.1-156.Z) and an entity type (158.1-158.Z), as previously described with reference to FIG. 1C.

In one or more embodiments of the invention, the equivalence map (118), shown in FIG. 1D, may be used to establish relationships between anonymization dictionary entries, based on resources responsible for the generation of the anonymization dictionary entries. Entries that are known to be affiliated with, for example, the same resource such as a user or a company may be linked together by an identity relationship (162.1-162.Z) in the equivalence map (118). An identity relationship may be, for example, a list of the anonymization identifiers in the anonymization dictionary that are affiliated with the same resource, a set of pointers indicating entries in the anonymization dictionary that are affiliated with the same resource, or any other construct suitable for identifying related entries in the anonymization dictionary.

Consider the previously described scenario, where user "John Smith" uses the email accounts "j.smith@gmail.com", "john_smith@yahoo.com" and "john.smith@company.com". The anonymization dictionary may include three entries for the three email addresses. All three target entities are of the entity type "email address". The anonymization dictionary, however, does not define an affiliation with a common resource (user "John Smith") for these entries. In order to establish an affiliation of all three entries with the common resource, the equivalence map includes an identity relationship that links the three anonymization dictionary entries.

In another alternative embodiment of the invention, the affiliation of anonymization dictionary entries with resource groups may not be documented. Anonymization dictionary entries may therefore be independent from one another regardless of whether they originate from a common resource. The anonymization repository, in this embodiment, may therefore include an anonymization dictionary (116) that does not structure entries based on resource profile affiliation. The anonymization identifiers in this embodiment may include anonymized IDs that are globally unique within the dictionary, but they may not include an instance ID.

Returning to the previously described scenario, where user "John Smith" uses the email accounts "j.smith@gmail.com", "john_smith@yahoo.com" and "john.smith@company.com", the anonymization dictionary may include three entries for the three email addresses. All three target entities are of the entity type "email address". The anonymization dictionary, however, does not define an affiliation with a common resource (user "John Smith") for these entries. The affiliation with a common resource may therefore not be documented by the anonymization dictionary, in accordance with this particular embodiment of the invention. To perform an anonymization of a target entity detected in an activity record, the anonymization engine may search the anonymization dictionary for the target entity. The anonymization engine may then replace the target entity with the anonymized identifier that corresponds to the target entity in the anonymization dictionary. If the anonymization dictionary does not include an entry for the target entity, the anonymization engine may add such an entry to the anonymization dictionary.

One skilled in the art will recognize that the system for anonymizing activity records is not limited to the components shown in FIGS. 1A-1D. For example, various components, including the anonymization engine, the anonymization dictionary, the anonymized activity record repository and the threat analysis engine, may exist repeatedly, either locally, or distributed over multiple computing devices on-premises, off-premises and/or cloud-based, for example, in order to perform distributed anonymization of activity records. Further, anonymization may be performed to different degrees, either in parallel, or serially. In addition, activity records to be anonymized may not necessarily originate from a computing device equipped with an endpoint agent. For example, the activity records may be obtained via an application programming interface (API) from third party applications, or any other source that may provide activity records that require anonymization. Also, even though particular structures of the anonymization correspondence repository are shown in FIGS. 1C and 1D, the anonymization correspondence repository may be structured in any other way, as long as the anonymization dictionary included in the anonymization repository establishes relationships between target entities and anonymized identifiers.

FIGS. 2A, 2B, 3A and 3B show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2A, 2B, 3A and 3B may be performed in parallel with any other steps shown in FIGS. 2A, 2B, 3A and 3B without departing from the invention.

Figure 2A:
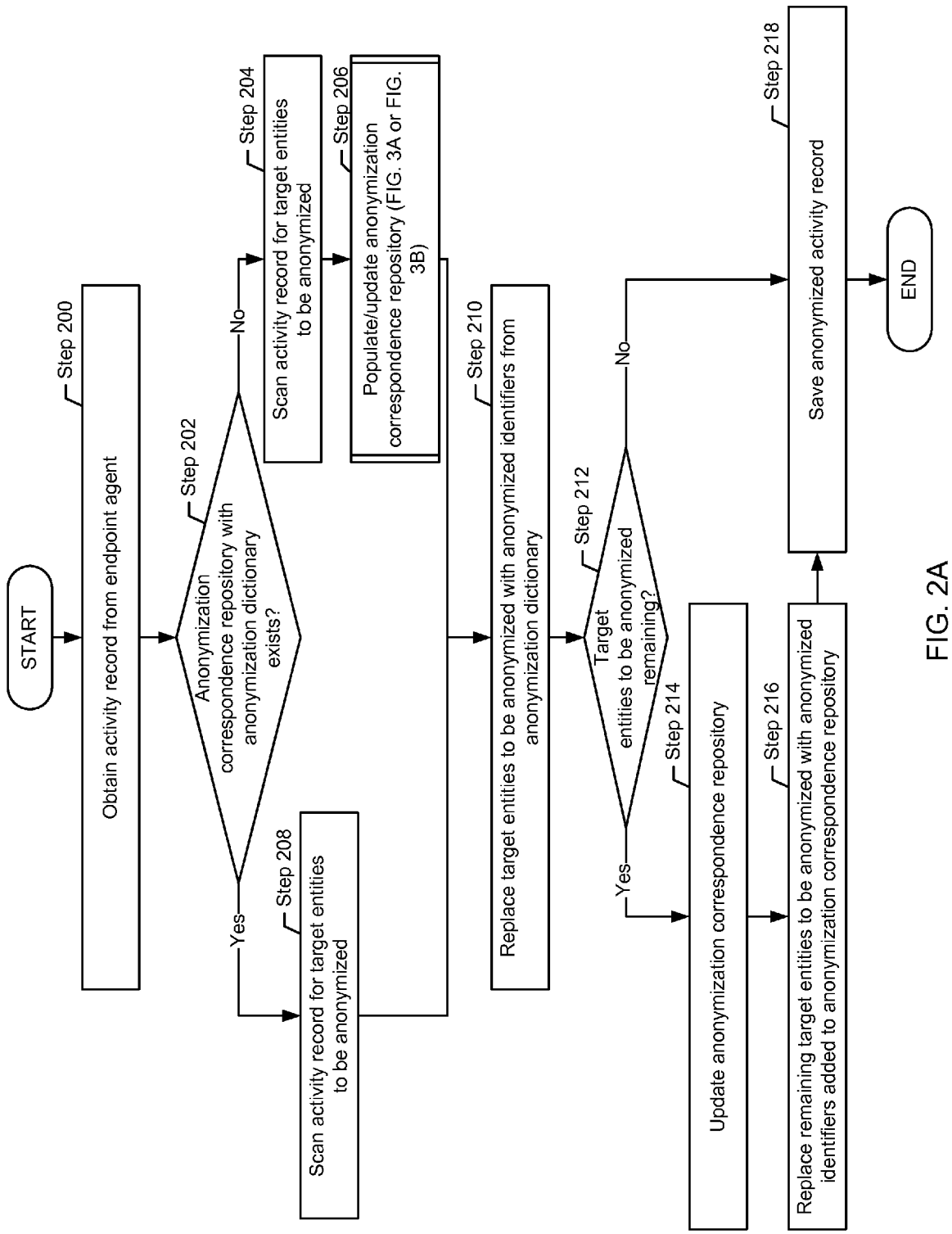
FIGS. 2A and 2B show flowcharts in accordance with one or more embodiments of the invention.
Figure 2B:
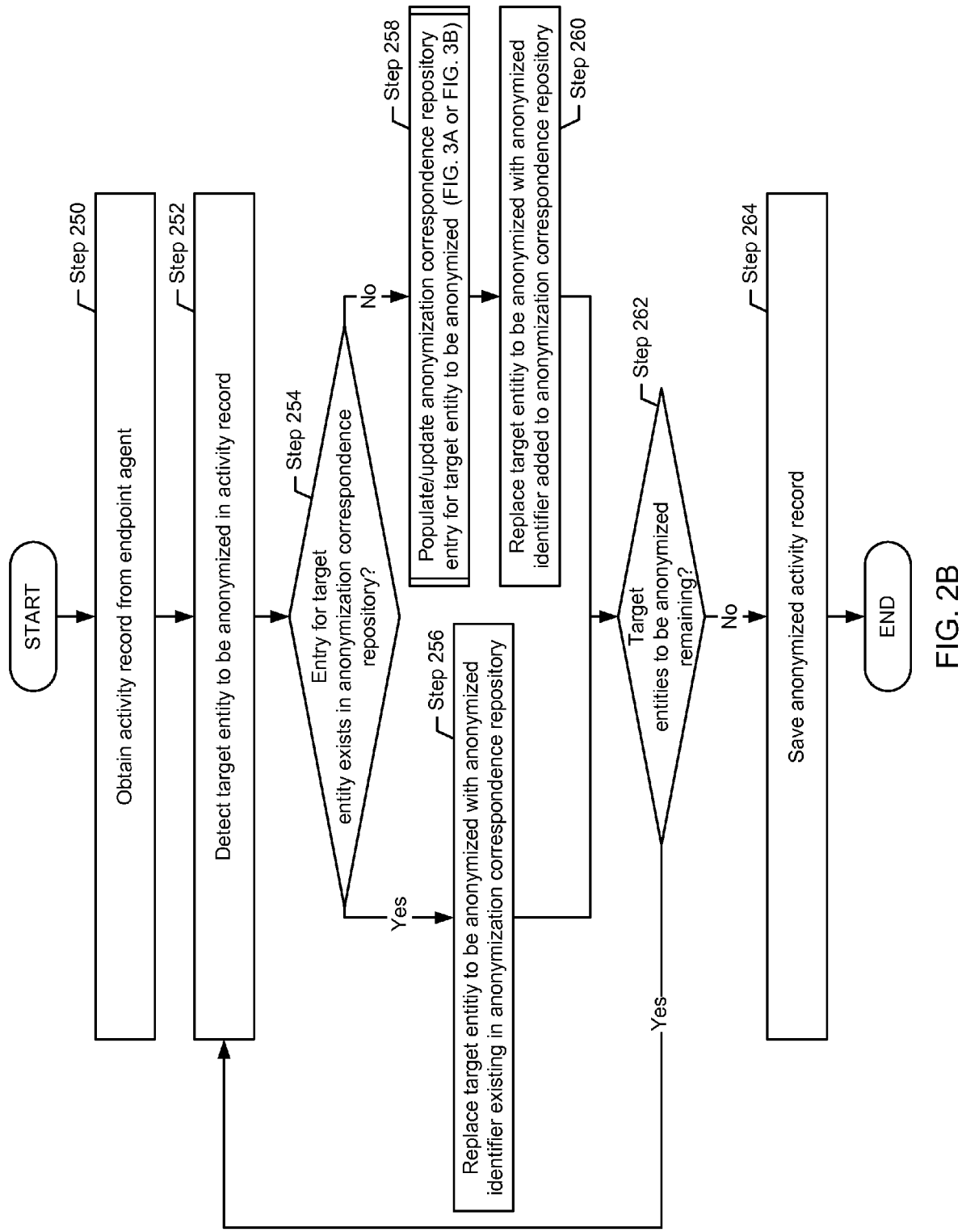

FIGS. 2A and 2B show methods for anonymizing activity records. During the anonymization of activity records, target entities to be anonymized may be identified, and subsequently these target entities may be replaced by anonymized identifiers. The anonymized identifiers used for replacing the target entities may be obtained from an anonymization dictionary. If an entry for the target entity does not exist in the anonymization dictionary, or if the anonymization dictionary itself does not exist, an entry in the anonymization dictionary or the anonymization dictionary itself, respectively, may be generated prior to replacing the target entities by the anonymized identifier. What constitutes a target entity to be replaced may be configurable. For example, only user identity-related target entities, e.g., user names, email addresses, etc. may be anonymized if the resulting anonymized activity records remain within the company. Alternatively, company resource-related target entities in general, e.g., user names, email addresses, domain names, IP addresses, etc. may be anonymized, for example if the resulting anonymized activity records are shared with external $3^{rd}$ parties. Accordingly, the methods described in FIGS. 2A and 2B may be executed repeatedly, serially or in parallel, for the same activity records to obtain different degrees of anonymization. The method may be executed whenever an activity record or a set of activity records is obtained from an endpoint agent. Alternatively, the method may only be executed when activity records from a particular endpoint agent or a group of endpoint agents are received, while activity records from other endpoint agents are ignored. In one or more embodiments of the invention, certain steps of the methods described in FIGS. 2A and 2B may be performed in a distributed manner. The details of distributed versus local execution of these steps are discussed below.

In the following discussion of FIGS. 2A and 2B, FIG. 2A describes an embodiment of the invention where a dictionary may be generated in a first pass over the activity record(s), and where subsequently, the activity record(s) may be anonymized in a second pass over the activity record(s), whereas FIG. 2B describes an embodiment of the invention where the generation of the dictionary and the anonymization of the activity record(s) may be performed in a single pass over the anonymization record(s). In one embodiment of the invention, the methods may be executed independently each time an activity record or a set of activity records is received, i.e., subsequent receipt of an additional activity record may result in renewed execution of the methods, independent from the previous execution. Repeated execution of the methods may therefore result in the generation of separate, independent anonymization correspondence repositories that may only be applicable to the activity record(s) from which they are derived. In an alternative embodiment, subsequent execution of the methods for a newly received user activity record may be dependent upon previous execution of the methods for a previously received user activity record. Accordingly, the anonymization correspondence repository, established when processing previously received activity records, may be used to anonymize a subsequently received activity record. During the processing of the subsequently received activity record, additional entries may be added to the anonymization correspondence repository, if the subsequently received activity record includes target entities not yet included in the anonymization correspondence repository.

Turning to FIG. 2A, in Step 200, the anonymization engine of the activity monitoring engine obtains an activity record from an endpoint agent. The activity record may be obtained, for example, by the endpoint agent pushing the activity record as it becomes available, or by the activity monitoring engine polling the endpoint agent for new activity records. Activity records may be obtained continuously, as they are generated by an endpoint agent, or they may be obtained in batches, for example, in scenarios where the endpoint agent accumulates activity records and provides them to the anonymization engine at fixed time intervals. In one embodiment of the invention, the activity record may be access-protected for the transmission from the endpoint agent to the anonymization engine, e.g., using encryption.

In Step 202, a determination is made about whether an anonymization correspondence repository exists. If no anonymization dictionary exists, the method may proceed to Step 204.

In Step 204, the activity record, obtained in Step 200, is scanned for target entities to be anonymized. Various methods for detecting target entities may be employed. The following includes a description of exemplary methods for detecting target entities. The exemplary methods are not intended to limit the scope of the invention.

Exemplary Method 1—Information about Target Entities May be Provided.

For example, the IT administrator may provide a list of user names, email addresses, company names, host names, and/or domain names, etc. In addition, or alternatively, arbitrary strings, deemed sensitive, may be provided. Accordingly, the scanning of an activity record may be performed based on the provided target entities.

Exemplary Method 2—Information about Target Entities May be Inferred from Information that is Accessible to the Anonymization Engine.

For example, the anonymization engine may parse the local directories of servers and users' computing devices for user profiles that may reveal information about target entities. Consider, for example, a computing device using a Microsoft Windows® operating system. In such a system, information about the users of the system may be obtained by inspecting the "\Users" directory, and/or the "\Documents and Settings" directory which may include login names of the users of the system. User names in the format "domain\username" may further allow the extraction of the domain name.

Exemplary Method 3—Information about Target Entities May be Derived.

Consider a scenario where a user "John Smith" is already known. The known user name "John Smith" may be used to derive potential additional target entities. For example, a variety of potential email identifiers may be predicted. These may include, for example, "john.smith", "j.smith", "j_smith", etc.

Exemplary Method 4—Information about Target Entities May be Extracted by Analyzing Structural Characteristics within an Activity Record, Thus Enabling the Identification of Target Entities Based on Typical, Recognizable Characteristics.

For example, if an activity record includes "john.smith@gmail.com", this content may be identified as an email address, based on the characteristic format of email addresses. "john.smith" may be identified as an email identifier, and "gmail.com" may be identified as the domain name of the email provider. In addition, a user name may be derived from the email identifier. Similarly, other target identities, such as, IP addresses, may also be identified based on their characteristic format.

Exemplary Method 5—Information about Target Entities May be Obtained Using Statistical Methods and Artificial Intelligence Methods.

For example, machine learning, natural language processing, etc. may be used. This may allow, for example, disambiguation in cases where a term may be either a target entity to be anonymized or a non-target entity term. Consider for example a scenario where an activity record includes information about a user with the last name "Stamp" performing an internet search for a postage stamp. The instances of "stamp," detected in the activity may then be disambiguated in context of related information in the activity record. For example, "Joe Stamp" may be identified as a user name that may be a target entity, whereas "postage stamp" and/or "rubber stamp" may not be considered a target entity.

Those skilled in the art will appreciate that the aforementioned methods may be used in combination. Further, the invention is not limited to the aforementioned methods for detecting target entities to be anonymized.

After completion of the scanning of the activity record for target entities, the detected target entities may be analyzed for plausibility. Non-plausible target entities may be eliminated. For example, target entities that occur at an excessively high frequency may be eliminated. The threshold that defines "excessively high" may be configurable and may be a ratio such as the number of instances detected for a particular target entity vs. overall word count in an activity record. Other rules may be employed to eliminate detected target entities based on format and/or context, for example to eliminate instances where the target entity appears within a word.

Further, based on the detected target entities, additional related entities may be identified. For example, consistent appearance of an expression occurring uniquely with a target entity may indicate that the expression needs to be anonymized as well. The expression may there be added to the target entities to be anonymized.

In Step 206, the anonymization correspondence repository including the anonymization dictionary is populated/updated. The details of Step 206 are described in FIGS. 3A and 3B. Depending on the type of anonymization correspondence repository being used, either the method described in FIG. 3A or the method described in FIG. 3B is executed. If the anonymization correspondence repository is of the type described in FIG. 1C, the method shown in FIG. 3A may be executed, whereas the method shown in FIG. 3B may be executed if the anonymization correspondence repository is of the type described in FIG. 1D. Completion of Step 206 marks the completion of the first pass, i.e., the population or updating of the anonymization correspondence repository.

Returning to Step 202, if a determination is made that the anonymization correspondence repository exists, the method may proceed to Step 208. In Step 208, the activity record obtained in Step 200 may be scanned for target entities to be anonymized. The scan may be performed as described in Step 204. Note that the existence of the anonymization correspondence repository may only be checked (Step 202) in embodiments where an existing anonymization correspondence repository is used to anonymize subsequently received activity records. In embodiments of the invention where separate anonymization correspondence repositories are generated for subsequently received activity records, Steps 202 and 204 may not exist, i.e., the method may then proceed from Step 202 to Step 210 via Steps 204 and 206.

Continuing with the discussion of FIG. 2A, in Step 210, the target entities to be anonymized are replaced with the corresponding anonymized identifiers which may include anonymized IDs, obtained from the anonymization dictionary in the anonymization correspondence repository. Completion of Step 210 marks the completion of the second pass, i.e., the anonymization of the activity record.

In one embodiment of the invention, the anonymization engine may rank entity types in a particular order. The ranking may be based on the degree of information a particular entity type provides. For example, the entity type "user name" may provide more information about a target type than the entity type "email address" because user names are detected only for users that have a user account allowing them to log on to a computing device of the company, whereas an email address may be an email address of a company-internal or external user. Accordingly, the information provided by a target entity "user name" may be more specific than the information provided by a target entity "email address". In one embodiment of the invention, the highest-ranked entity type of the entry may be inserted along with the anonymized identifier, rather than the entity type associated with the target entity being replaced. Consider, for example, a scenario where an anonymization dictionary entry exists that includes a user name and four email addresses. Accordingly, five target entities exist (one for the user name, and four for the email addresses). When a target entity is replaced using this anonymization dictionary entry, the target is replaced by the anonymized identifier and the entity type "user name", even if the replaced target entity is of the entity type "email address", based on the highest ranking of the entity type "user name".

For illustrative examples of the replacement of target entities with the corresponding anonymized identifiers and entity types, see FIG. 4 and the associated description below.

Continuing with the discussion of FIG. 2A, in Step 212, a determination is made about whether target entities to be anonymized are remaining. Target entities may be remaining if the anonymization dictionary did not include the entries necessary to resolve the remaining target entities. This may occur, for example, if the anonymization correspondence repository is based on an initial activity record or set of activity records, and when a newly received activity record that includes target entities that do not exist in the anonymization correspondence repository, is being processed. If target entities are remaining, the method may proceed to Step 214.

In Step 214, the anonymization correspondence repository is updated with the remaining target entities. The addition of an entry is described in detail below, with reference to FIGS. 3A and 3B.

Continuing with the discussion of FIG. 2A, in Step 216, the remaining target entities to be anonymized are replaced with the corresponding anonymized identifiers which were added to the anonymization correspondence repository in Step 214.

In certain scenarios, the target entities to be anonymized may only be remaining after the execution of Step 210 in cases where the method described in FIG. 2A is used to anonymize an activity record using an anonymization correspondence repository that was generated based on an earlier activity record. In embodiments of the invention where separate anonymization correspondence repositories are generated for subsequently received activity records, Steps 212-216 may not apply, i.e., the method may always proceed from Step 210 directly to Step 218.

Returning to Step 212, if a determination is made that no target entities to be anonymized are remaining, the method may proceed to Step 218.

In Step 218, the anonymized activity record is stored. In one or more embodiments of the invention, the anonymized activity record may be stored to the previously described anonymized activity record repository. The threat analysis engine may access the anonymized activity records stored in the anonymized activity record repository in order to analyze the stored activities for indications of threats, in accordance with one or more embodiments of the invention.

The following description of FIG. 2B covers an embodiment of the invention where the generation of the dictionary and the anonymization of the activity record(s) may be performed subsequently in a single pass over the anonymization record(s), i.e., after the detection of a target entity, the target entity and a corresponding anonymized identifier are added to the anonymization correspondence repository, and the target entity is then replaced by the anonymized identifier, before repeating these steps for the next target entity detected in the anonymization record(s). Analogous to the method described in FIG. 2A, the method described in FIG. 2B may be executed independently each time an activity record or a set of activity records is received, thus generating separate anonymization dictionaries that are specific to the activity records from which they are generated. In an alternative embodiment, a previously generated anonymization dictionary may be used to anonymize additional activity records being processed in subsequent executions of the method described in FIG. 2B. In this case, a single anonymization dictionary may be used for the anonymization and/or de-anonymization of multiple sets of activity records.

Turning to FIG. 2B, in Step 250, the anonymization engine of the activity monitoring engine obtains an activity record from an endpoint agent. The activity record may be obtained, for example, by the endpoint agent pushing the activity record as it becomes available, or by the activity monitoring engine polling the endpoint agent for new activity records. Activity records may be obtained continuously, as they are generated by an endpoint agent, or they may be obtained in batches, for example, in scenarios where the endpoint agent accumulates activity records and provides them to the anonymization engine at fixed time intervals. In one embodiment of the invention, the activity record may be access-protected for the transmission from the endpoint agent to the anonymization engine, e.g., using encryption.

In Step 252, a target entity to be anonymized is detected in the user activity record, obtained in Step 250. Initially, the first entity to be anonymized in the user activity record may be detected. After detection, Steps 254-262 may be executed on the detected target entity. Subsequently, the next target entity may be detected in the user activity record, and Steps 254-262 may then be repeated for that next detected target entity, etc. Various methods for detecting target entities may be employed, as previously described with reference to Step 204 of FIG. 2A. Those skilled in the art will appreciate that the aforementioned methods may be used in combination. Further, the invention is not limited to the aforementioned methods for detecting target entities to be anonymized.

In Step 254, a determination is made about whether an entry exists in the anonymization correspondence repository for the target entity. An entry may exist, if another instance of the target entity was previously detected in the activity record, thus having triggered the addition of the entry for the target entity to the anonymization dictionary in the anonymization correspondence repository. If an entry for the target entity to be anonymized exists in the anonymization dictionary, the method may proceed to Step 256.

In Step 256, the target entity to be anonymized is replaced with the corresponding anonymized identifier, obtained from the anonymization dictionary in the anonymization correspondence repository. Additional details regarding the replacement are provided in the description of Step 210 in FIG. 2A.

Returning to Step 254, if a determination is made that an entry for the target entity to be anonymized does not exist in the anonymization dictionary, the method may proceed to Step 258.

In Step 258, the anonymization correspondence repository including the anonymization dictionary is generated. The details of Step 258 are described in FIGS. 3A and 3B. Depending on the type of anonymization correspondence repository being used, either the method described in FIG. 3A or the method described in FIG. 3B is executed. If the anonymization correspondence repository is of the type described in FIG. 1C, the method shown in FIG. 3A may be executed, whereas the method shown in FIG. 3B may be executed if the anonymization correspondence repository is of the type described in FIG. 1D.

In Step 260, the target entity to be anonymized is replaced with the corresponding anonymized identifier that was added to the anonymization correspondence repository in Step 258.

In Step 262, a determination is made about whether target entities are remaining in the activity record being processed. If target entities are remaining, the method may return to Step 252 in order to detect the next target entity to be anonymized in the activity record. If a determination is made that no target entities to be anonymized are remaining, the method may proceed to Step 264.

In Step 264, the anonymized activity record is stored. In one or more embodiments of the invention, the anonymized activity record may be stored to the previously described anonymized activity record repository. The threat analysis engine may access the anonymized activity records stored in the anonymized activity record repository in order to analyze the stored activities for indications of threats, in accordance with one or more embodiments of the invention.

One or more of above described steps of FIGS. 2A and 2B may be performed in a distributed manner. For example, the anonymization may be performed by multiple workers. A worker may be, for example, one of the computing devices with an endpoint agent, or any other computing device capable of executing software that performs the steps described in FIGS. 2A and 2B. In one embodiment of the invention, in order to perform the anonymization, the workers may rely on a centrally maintained anonymization correspondence repository or local copies of the centrally maintained anonymization correspondence repository that are synchronized to the centrally maintained anonymization repository. Activity records to be anonymized may be distributed to the workers. The workers, after having anonymized the activity records that were distributed to them, may return the anonymized activity records to a centrally maintained anonymized activity record repository.

In another embodiment of the invention, each worker may generate and maintain a separate, independent anonymization dictionary (and equivalence map, if used). The workers may perform the anonymization of the activity records using the local, independent anonymization dictionaries. The workers may then provide the anonymized activity records to the centrally maintained anonymized activity record repository, where they may be stored. Further, the workers may also provide the local, independent anonymization dictionaries (and equivalence maps, if used) to the anonymization correspondence repository, where they may be stored. In this scenario, the anonymization dictionaries may only be valid for the anonymized activity records that were generated, along with the anonymization dictionary, from the same activity record(s) to be anonymized. Accordingly, the relationship between anonymization dictionaries stored in the anonymization correspondence repository on the one hand and the activity records stored in the anonymized activity record repository on the other hand, must be maintained in order to allow de-anonymization at a later time. In one embodiment of the invention, the collection of dictionaries in the anonymization correspondence repository may be transcribed into a common format suitable for translating the anonymized activity records into a common format that relies on the same anonymized identifiers for the same entries to be anonymized. In one embodiment of the invention, the common anonymization dictionary is generated by transcribing and merging the local dictionaries provided by the workers. The common anonymization dictionary may then be shared with the workers, thereby enabling all workers to anonymize future incoming activity records using the common dictionary.

In another embodiment of the invention, the activity records are distributed to a set of workers to perform Step 206 and the results of performing Step 206 are returned back to the anonymization engine. The anonymization engine may then proceed to generate an anonymization dictionary using the target entities identified by the workers. The anonymization engine may then provide a copy of the anonymization dictionary to each of the workers. The worker may subsequently perform Step 208 for the set of activity records that it initially received from the anonymization engine. The anonymized activity records may then be transmitted from the workers to anonymization engine.

Figure 3A:
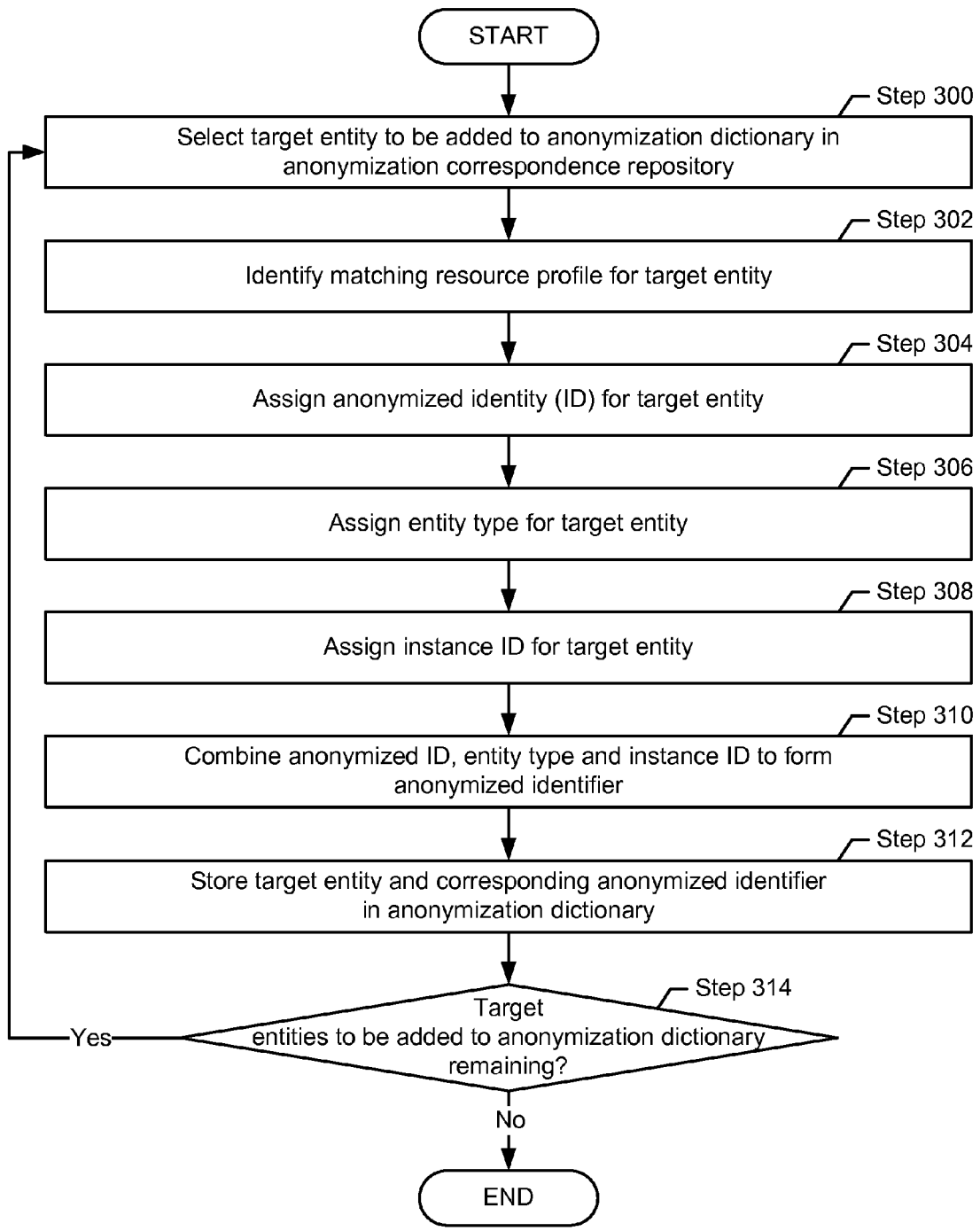
FIGS. 3A and 3B show flowcharts in accordance with one or more embodiments of the invention.
Figure 3B:
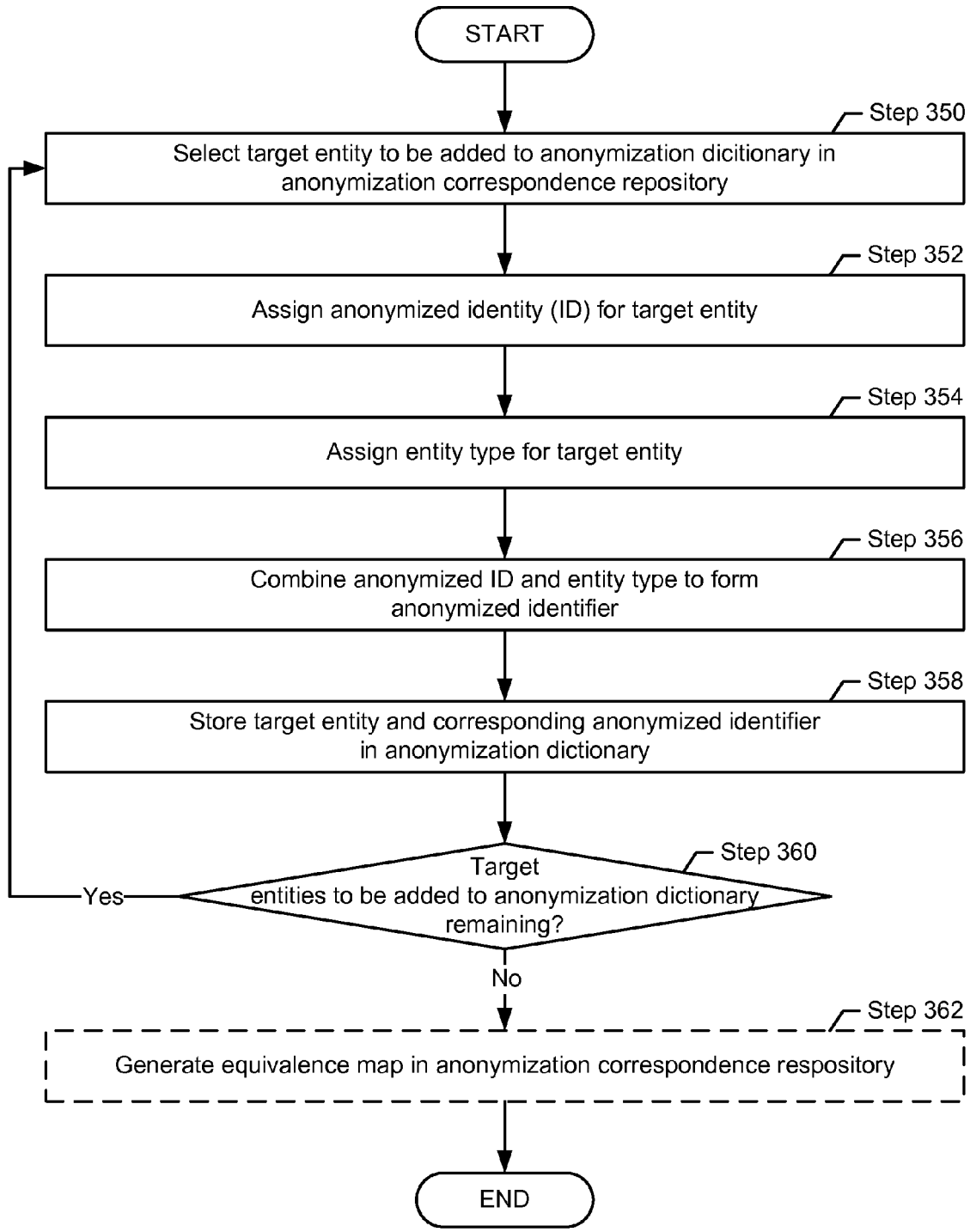

FIGS. 3A and 3B show methods for generating an anonymization correspondence repository that includes an anonymization dictionary. An anonymization dictionary may be created in preparation for performing an anonymization of activity records, as previously described in detail with reference to FIGS. 2A and 2B. The execution of the methods described in FIGS. 3A and 3B may result in an anonymization correspondence repository with a structure as shown, for example, in FIGS. 1C and 1D, respectively.

FIG. 3A describes a method for generating an anonymization correspondence repository, in accordance with one or more embodiments of the invention, where resource profiles are used to group entries for target entities that can be tracked back to a single resource (e.g. the same user, or the same company). For example, if a user uses multiple email addresses, these email addresses, when detected as target entities in an activity record, may be grouped, for example, by assigning the same anonymized identity (ID). In such a scenario, each entry generated for an email address may include a different instance ID, thus allowing the distinction of the entries, despite them having the same anonymized ID.

Turning to FIG. 3A, in Step 300, a target entity to be added to the anonymization dictionary in the anonymization correspondence repository is selected. If the method described in FIG. 3A is called from the method described in FIG. 2A, multiple target entities to be added to the anonymization dictionary may exist. In this case, the first target entity may be selected initially, and after completion of Steps 302-312 for the first target entity, the next target entity may be selected, etc. If the method described in FIG. 3A is called from the method described in FIG. 2B, only one target entity to be added to the anonymization dictionary may exist. In this case, Steps 302-312 may only be executed once.

In Step 302, a matching resource profile is determined for the target entity to be added to the anonymization dictionary. For example, if a first target entity "John Smith" and a second target entity "john.smith@gmail.com" have been identified in an activity record, both target entities may be considered to be associated with the same user, i.e., they are considered to be associated with the same resource profile. Similarly, a resource profile may exist for a legal entity (e.g. a company), that may enable grouping of domain names, IP addresses, etc. that are known to be associated with the company. In one or more embodiments of the invention, different methods may be employed in order to identify a resource behind a target entity. The following lists exemplary methods that may be used to identify the resource associated with the target entity:

Exemplary Method 1—

Prior knowledge may be used to identify a resource associated with the target entity, e.g. if a system administrator has provided user names, user email addresses, and/or other user-related information).

Exemplary Method 2—

Similarities between different target entities may be exploited to identify a common associated user. For example, if a target entity "John Smith" exists for a user, another target entity "john.smith@google.com" may be identified as being associated with the same user. Additional target entities such as "j.smith", "j_smith", "smith_j", etc., may also be considered to be associated with the same common associated user.

Exemplary Method 3—

Information about target entities may be inferred from information that is accessible to the anonymization engine. For example, the anonymization engine may parse the local directories of servers and user's computing devices for user profiles that may reveal information about target entities. An email account for a particular email address organized in a user's profile directory may indicate, for example, that the email address is associated with the user.

Exemplary Method 4—

Information about related target entities that are associated with the same resource may be derived from the activity record itself. Consider, for example, a scenario where an activity record documents the sending of an email by a user. In the metadata of the activity record, there is a target entity documenting the user name. The user name was obtained by the endpoint agent from the title bar of the window for the email application. Further, the email address of the user sending the email, the host name and IP address of the computing device used for composing the email may be captured by the endpoint agent as the email is being sent. These entries may be located in close proximity in either a single activity record, or in consecutively generated activity records. Accordingly, the anonymization engine receiving the activity record(s) may determine that all the email address is affiliated with the same user.

Those skilled in the art will appreciate that the invention is not limited to the aforementioned methods for identification of a resource associated with a target entity. Further, the aforementioned methods may be used in combination to identify a resource associated with a target entity.

In one embodiment of the invention, a likelihood for different target entities being associated with the same resource may be determined. The target entities may then be considered to be associated with the same resource, if the likelihood exceeds a threshold. A non-limiting set of factors that may affect the likely hood may include, for example:

(a) A particular email account is accessed by multiple user accounts, where the statistical significance of the access is high in comparison to access of other email accounts by the user accounts. For example, if the email address "jsmith@company.com" is frequently accessed by accounts "james_smith" and "admin_james" the likelihood that the accounts "james_smith" and "admin_james" belong to the same user may be increased.

(b) A particular device is regularly accessed by multiple user accounts. For example, if both accounts "james_smith" and "admin_james" regularly log on to the computing device "PC1", the likelihood that the accounts "james_smith" and "admin_james" belong to the same user may be increased.

(c) A remote computing device is regularly accessed from the same local computing device using multiple user accounts. For example, if two accounts "james_smith" and "admin_james" regularly access remote computing device "PC2" from local computing device "PC1", the likelihood that the accounts "james_smith" and "admin_james" belong to the same user may be increased.

(d) A cluster analysis for specific utilization parameters (e.g. software applications used, working hours, websites visited, task switching behavior, etc.) may be performed. If similar clusters are obtained for multiple user accounts, the likelihood that these accounts belong to the same user may be increased.

(e) Common files and/or file paths occur only for certain user accounts. In this case the likelihood that the accounts belong to the same user may be increased.

In one embodiment of the invention, a matching resource profile is not resolved for target entities to be added to the anonymization dictionary. In this case Step 302 may be skipped. A matching resource profile may not be resolved if the anonymization dictionary is configured not to resolve resource profiles. A matching resource profile may, in addition, also not be resolved, even if the anonymization dictionary is configured to resolve resource profiles, in cases where available information about target entities is insufficient to identify the resources associated with the target entities. Consider, for example, a scenario where a user "John Smith" and an additional user "Joe Smith" are known to exist. Without additional information, it would not be possible to determine whether an email address "j.smith@google.com" is associated with user "John Smith" or with user "Joe Smith".

Continuing with the discussion of FIG. 3A, in Step 304, an anonymized identity (ID), previously described in detail with reference to FIG. 1C, is generated for the target entity to be added to the anonymization dictionary. In one embodiment of the invention, the same anonymized ID may be used for all entries affiliated with a resource profile. Accordingly, if a matching resource profile was identified for the target entity to be added to the anonymization dictionary in Step 302, the anonymized ID already being used for existing entries associated with the resource profile may be assigned. If entries for the same resource profile do not yet exist in the anonymization dictionary, a new anonymized ID, different from all other anonymized IDs in the anonymization dictionary, may be assigned. In embodiments of the invention, where resource profiles are not resolved, i.e., where Step 302 is skipped, or in cases where the resource profile identification in Step 302 was unsuccessful, a new anonymized ID, different from all other anonymized IDs in the anonymization dictionary, may be assigned.

In Step 306, the entity type is determined for the target entity. The entity type for a detected target entity may be, for example, "user name", "email address", "company name", "domain name", "IP address", "host name", and "other". Different methods may be employed to determine the entity type of a target entity. The following lists exemplary methods that may be used to identify the entity type of the target entity.

Exemplary Method 1—

For the entity type "user name", the determination may be made based on information provided by the administrator. For example, the administrator may indicate that "John Smith" and "Joe Smith" are user names. Alternatively, and/or in addition, user names may be obtained by parsing the local directories of servers and/or user's computing devices for user profiles such as the "\Users" directory, and/or the "\Documents and Settings" directory.

Exemplary Method 2—

For the entity type "email address", the determination may be made based on the characteristic format of an email address (email_identity @ email_provider).

Exemplary Method 3—

For the entity types "company name", and other strings deemed sensitive data (e.g. name of collaboration partners, i.e., partner names), the determination may be made based on information provided by the administrator, i.e., a list of terms including the associated entity type may be provided.

Exemplary Method 4—

For the entity type "domain name" and "IP address", the determination may be made based on the characteristic formats of domain names and IP addresses. For example, an IPv4 address may be represented by 4 bytes separated by the "." sign. Domain names may be represented in a format such as "domain\username" or "username @ domain".

Exemplary Method 5—

For the entity type "host name", the determination may be made based on the endpoint agents using a specific field for documenting the host name when generating an activity record. Those skilled in the art will appreciate that the invention is not limited to the aforementioned methods for determining entity types associated with target entities.

Continuing with the discussion of FIG. 3A, in Step 308, an instance ID is determined for the target entity. As previously discussed with reference to FIG. 1C, the instance IDs assigned to entries generated for different target entities may be unique within a resource profile, or they may be globally unique within the anonymization dictionary. In one embodiment of the invention, the instance ID may be included in the anonymized ID. In this case, the anonymized identifier may not include a separate entry dedicated to the instance ID. Further, in an alternative embodiment of the invention where a matching resource profile is not resolved for target entities to be added to the anonymization dictionary, there may be no instance IDs, and Step 308 may therefore be skipped.

In Step 310, the anonymized ID (assigned in Step 304), the entity type (assigned in Step 306), and the instance ID (assigned in Step 308, if used by the implementation of the anonymization dictionary) are combined to form an anonymized identifier, previously described with reference to FIG. 1C.

In Step 312, an entry including the target entity and the corresponding anonymized ID, established in Step 310, are stored in the anonymization dictionary.

In Step 314, a determination is made about whether target entities to be added to the anonymization dictionary are remaining. If target entities to be added to the anonymization dictionary are remaining, the method may return to Step 300.

FIG. 3B describes a method for generating an anonymization correspondence repository, in accordance with one or more embodiments of the invention, where an equivalence map is used to group entries for target entities that can be tracked back to a single resource (e.g. the same user, or the same company). The equivalence map may be included in the anonymization correspondence repository, in addition to the anonymization dictionary.

Turning to FIG. 3B, in Step 350, a target entity to be added to the anonymization dictionary in the anonymization correspondence repository is selected. If the method described in FIG. 3B is called from the method described in FIG. 2A, multiple target entities to be added to the anonymization dictionary may exist. In this case, the first target entity may be selected initially, and after completion of Steps 352-358 for the first target entity, the next target entity may be selected, etc. If the method described in FIG. 3B is called from the method described in FIG. 2B, only one target entity to be added to the anonymization dictionary may exist. In this case, Steps 352-358 may only be executed once.

In Step 352, an anonymized identity (ID), previously described in detail with reference to FIG. 1C, is generated for the target entity to be added to the anonymization dictionary. A new anonymized ID, different from all other anonymized IDs in the anonymization dictionary, may be assigned.

In Step 354, the entity type is determined for the target entity. The entity type for a detected target entity may be, for example, "user name", "email address", "company name", "domain name", "IP address", "host name", and "other". Different methods, as previously described with reference to Step 306 of FIG. 3A may be employed to determine the entity type of a target entity.

In Step 356, the anonymized ID (assigned in Step 352) and the entity type (assigned in Step 354) are combined to form an anonymized identifier, previously described with reference to FIG. 1D.

In Step 358, an entry including the target entity and the corresponding anonymized ID, established in Step 356, are stored in the anonymization dictionary.

In Step 360, a determination is made about whether target entities to be added to the anonymization dictionary are remaining. If target entities to be added to the anonymization dictionary are remaining, the method may return to Step 350. If a determination is made that no target entities to be added to the anonymization dictionary are remaining, the method may proceed to Step 362.

In Step 362, an equivalence map is generated in the anonymization correspondence repository. The equivalence map may be used to group entries for target entities and the corresponding anonymization identifiers in the anonymization dictionary based on resources with which the target entities are affiliated. First, for each entry in the anonymization dictionary the methods described in Step 302 of FIG. 3A may be used in order to determine a resource associated with the target entity of the entry. Those skilled in the art will appreciate that the invention is not limited to these aforementioned methods for identification of a resource associated with a target entity. Further, the aforementioned methods may be used in combination to identify a resource associated with a target entity. Next, once the resources associated with the target entities have been identified, an identity relationship may be established in the equivalence map for each resource with multiple associated entries in the anonymization dictionary, thus linking entries for target entities that are associated with the resource (e.g. a user or a legal entity). The identity relationships may then be stored in the equivalence map.

In one embodiment of the invention, the equivalence map may be generated subsequent to completion of the anonymization dictionary for an activity record or a set of activity records. Alternatively, the equivalence map may be generated asynchronously, for example in a background process, at scheduled times, caused by certain trigger events, e.g., upon request by an application or analysis engine that requires information stored in the equivalence map, and/or under certain conditions, e.g. during times of low system load. Further, the equivalence map may be updated at regular intervals or upon availability of additional information that may allow the identification of a resource associated with a particular target entity, where the information previously available was not sufficient to perform the identification of the associated resource. In another embodiment of the invention, no equivalence map is generated, i.e. Step 362 is skipped entirely.

FIG. 4 shows an example of an anonymization of an activity record performed in accordance with one or more embodiments of the invention. The example shown in FIG. 4 is not intended to limit the invention. The upper panel shows the sample activity record to be anonymized, and the lower panel shows the resulting anonymized activity record. In the activity record to be anonymized (upper panel) all target entities detected by the anonymization engine are marked by dashed rectangles. A total of seven target entities were detected: The first target entity is the user name "mark.thawley". The second target entity is the email address "pavel.sherbakov@ggmmaaiill.com", i.e. the email identity is "pavel.sherbakov". The third target entity is again the user name "mark.thawley". The fourth target entity is again the email address "pavel.sherbakov@ggmmaaiill.com". The fifth target entity is the domain name "DS\WIN81RS. The sixth target entity is the IP address "192.168.1.20". The seventh target entity is again the user name "mark.thawley".

In the example shown in FIG. 4, the anonymization engine is configured to anonymize all of the above target entities. The format of the entries replacing the target entities after anonymization is [ }1-entity type-anonymized identifier{ ]. The anonymized identifier for the user mark.thawley is "9", with the entity type being "USER", thus indicating a user with a corporate user account. The anonymized identifier for email identity "pavel.sherbakov" is "5", with the entity type "EMAIL", indicating an email identifier. Note that the entity type would have been "USER" for the email identity "pavel.sherbakov" if a corporate user account under that name existed. The anonymized identifier for the domain name "DS\WIN81RS" is "6" with the entity type being "DOMAIN", indicating a domain name. The anonymized identifier for the IP address "192.168.1.20" is "2" with the entity type being "AIP", indicating an IP address.

Accordingly, the target entities in the activity record are replaced as shown in the anonymized activity record (lower panel) of FIG. 4.

In one or more embodiments of the invention, anonymized activity records, obtained using the methods described above, may be de-anonymized in order to identify resources associated with anonymized identifiers in the anonymized activity records. A de-anonymization may be necessary, for example, when the threat analysis engine issues a threat alert. In order to assess the threat and to take threat-mitigating action, it may be necessary to identify the resource associated with the activities in the anonymized activity records that have caused the alert. In one or more embodiments of the invention, the anonymization dictionary may be used to perform the de-anonymization, i.e., the translation from anonymized identifier(s) to resource(s). The de-anonymization may be performed as needed, i.e., depending on the nature of the threat alert, the de-anonymization may only be partially performed, for example for certain entity types. For example, if the threat appears to originate from an employee, only user names may be de-anonymized. In another case, where the nature of the threat alert is unknown, all entity types may need to be de-anonymized, i.e., a complete de-anonymization of all anonymized identifiers in an entire anonymized activity record may be performed.

Embodiments of the invention may enable the anonymization of activity records, thereby protecting resource identities, without limiting the analysis of the activities included in the activity records for threats. Threat detection may therefore be performed using the anonymized activity records. Further, the anonymization of the activity records, by classifying the entity type for each target entity being anonymized, adds structure to the activity records, which may improve and/or facilitate threat detection. In addition, various configurable levels of anonymization may allow to the activity monitoring to satisfy requirements of various different scenarios, ranging from anonymization used for company-internal threat monitoring to anonymization prior to publicly sharing the anonymized activity records, where they may be used by developers to design and validate threat detection algorithms and anonymization engines. Overall, the anonymization, performed in accordance with embodiments of the invention, may facilitate compliance with company-internal guidelines and national laws requiring the protection of user identities.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing activity records, the method comprising:
    establishing, by a computing system, an anonymization dictionary based on user activity encountered by the computing system, by:
        obtaining, by an endpoint agent executing on the computing system, an activity record, wherein the activity record comprises metadata documenting the user activity;

generating, by an activity monitoring engine of the computing system that is operatively connected to the endpoint agent, the anonymization dictionary, wherein generating the anonymization dictionary comprises:
  detecting, in the activity record, a plurality of target entities, wherein each of target entities is metadata related to the user activity and requires anonymization;
  making a determination that a resource is associated with a subset of the target entities of the plurality of target entities;
  after making the determination:
    assigning an anonymized identity to the subset of target entities;
    generating an anonymization identifier for each target entity in the subset of target entities to obtain a plurality of anonymization identifiers each comprising the anonymized identity; and
anonymizing user activity, based on the anonymization dictionary previously generated by the computing system by:
  processing, by an anonymization engine executing on the computing system, the activity record using the anonymization dictionary to obtain an anonymized activity record, by:
    replacing, in the activity record, target entities with their corresponding anonymized identifiers, specified in the anonymization dictionary; and
  storing the anonymized activity record.

2. The method of claim 1,
wherein generating the anonymization dictionary further comprises, for each target entity in the subset of target entities: assigning an entity type of the target entity,
wherein generating the anonymization identifier for each target entity comprises storing the entity type in the anonymized identifier.

3. The method of claim 2, wherein the entity type is at least one selected from the group consisting of a user name, an email address, a domain name, an IP address, a port number, a host name, a company name, and a partner name.

4. The method of claim 2,
wherein, for at least two target entities in the subset of target entities, the entity type is identical, and
wherein a unique instance identifier is assigned to each of the at least two target entities, and
wherein the unique instance identifiers are included in the anonymized identifiers for the at least two target entities.

5. The method of claim 4, wherein the unique instance identifiers are globally unique identifiers.

6. The method of claim 1, further comprising:
receiving an additional activity record;
processing the additional activity record to obtain a second plurality of target entities;
making a second determination that the anonymization dictionary does not have an entry to anonymize at least one of the second plurality of target entities;
based on the second determination, updating the anonymization dictionary to include at least one additional entry in order to obtain an updated anonymization dictionary; and
processing the additional activity record using the updated anonymization dictionary to obtain a second anonymized activity record.

7. The method of claim 1 further comprising:
receiving an additional activity record;
processing the additional activity record to obtain a second plurality of target entities;
making a second determination that the anonymization dictionary has an entry to anonymize at least one of the second plurality of target entities;
based on the second determination, processing the additional activity record using the anonymization dictionary to obtain a second anonymized activity record.

8. The method of claim 1, wherein each of the plurality of target entities comprises at least one selected from a group consisting of an email address, a domain name, an IP address, a port number, a host name, a company name, and a partner name.

9. The method of claim 1, wherein the anonymization dictionary is an access-protected database.

10. The method of claim 1, further comprising:
analyzing the anonymized activity record using a threat detection algorithm.

11. The method of claim 1, wherein the resource is a user.

12. A method for processing activity records, the method comprising:
establishing, by a computing system, an anonymization dictionary based on user activity encountered by the computing system, by:
  obtaining, by an endpoint agent executing on the computing system, an activity record, wherein the activity record comprises metadata documenting the user activity;
  generating, by an activity monitoring engine of the computing system that is operatively connected to the endpoint agent, the anonymization dictionary, wherein generating the anonymization dictionary comprises:
    detecting, in the activity record, a plurality of target entities, wherein each of the plurality of target entities is metadata related to the user activity and requires anonymization;
    assigning an anonymized identity to each unique target entity of the plurality of target entities;
    generating dictionary entries for the plurality of target entities, wherein each dictionary entry comprises a target entity and a corresponding anonymized identifier comprising the anonymized identity for the target entity;
generating, by the computing system, an equivalence map, by:
  making a determination that a resource is associated with a subset of the target entities of the plurality of target entities;
  storing, in the equivalence map, an identity relationship specifying that the subset of the target entities is associated with the resource;
anonymizing user activity, based on the anonymization dictionary previously generated by the computing system, by:
  processing, by an anonymization engine executing on the computing system, the activity record using the anonymization dictionary to obtain an anonymized activity record, by:
    replacing, in the activity record, target entities with their corresponding anonymized identifiers, specified in the anonymization dictionary; and
  storing the anonymized record.

13. The method of claim 12, wherein generating the equivalence map may be performed prior to storing the anonymized record.

14. The method of claim 12, wherein generating the equivalence map may be performed after storing the anonymized record.

15. A computing system, comprising:
at least one computer processor;
an endpoint agent comprising software instructions executing on the at least one computer processor, and enabling the computing system to:
  obtain an activity record, wherein the activity record comprises metadata documenting the user activity;
an activity monitoring engine comprising software instructions executing on the at least one computer processor, and enabling the computing system to establish an anonymization dictionary based on user activity encountered by the computing system, by:
  generating an anonymization dictionary, comprising:
    detecting, in the activity record, a plurality of target entities, wherein each of the target entities is metadata related to user activity and requires anonymization;
    making a determination that a resource is associated with a subset of the target entities of the plurality of target entities;
    assigning an anonymized identifier to the subset of target entities;
an anonymization engine comprising software instructions executing on the at least one computer processor, and enabling the computing system to
  anonymize user activity, based on the anonymization dictionary previously generated by the activity monitoring engine by:
    processing the activity record using the anonymization dictionary to obtain an anonymized activity record by:
      replacing, in the activity record, target entities with their corresponding anonymized identifiers, specified in the anonymization dictionary; and
a repository configured to store the anonymized activity record.

16. The system of claim 15, wherein the anonymization engine further comprises software instructions executing on the at least one computer processor, that enable the computing system to:
receive a request from a third-party system for the activity record;
in response to the request:
  identify the anonymized activity record;
  detect in the anonymized activity record a second plurality of target entities to anonymize;
  replace the second plurality of target entities with corresponding anonymized identifiers from the anonymization dictionary in order to obtain a second anonymized activity record; and
provide the second anonymized activity record to the third-party system.

17. The system of claim 15, wherein the anonymization engine further comprises software instructions executing on the at least one computer processor, that enable the computing system to:
receive a request from a third-party system for the anonymized activity record;
in response to the request:
  detect in the anonymized activity record a second plurality of target entities to anonymize;
  replace the second plurality of target entities with corresponding anonymized identifiers from the anonymization dictionary in order to obtain a second anonymized activity record; and
provide the second anonymized activity record to the third-party system.

18. The system of claim 15, further comprising:
a threat analysis engine comprising software instructions executing on the at least one computer processor, and enabling the computing system to analyze the at least one anonymized activity record using a threat detection algorithm.

19. The system of claim 15, further comprising:
a threat analysis engine comprising software instructions executing on the at least one computer processor, and enabling the computing system to analyze the at least one anonymized activity record using a threat detection algorithm and the equivalence map.

20. A computing system, comprising:
at least one computer processor;
an endpoint agent comprising software instructions executing on the at least one computer processor, and enabling the computing system to:
  obtain an activity record, wherein the activity record comprises metadata documenting the user activity;
an activity monitoring engine comprising software instructions executing on the at least one computer processor, and enabling the computing system to establish an anonymization dictionary based on user activity encountered by the computing system by:
  generating an anonymization dictionary, comprising:
    detecting in the activity record, a plurality of target entities, wherein each of the plurality of target entities is metadata related to the user activity and requires anonymization;
    assigning an anonymized identity to each unique target entity of the plurality of target entities;
    generating dictionary entries for the plurality of target entities, wherein each dictionary entry comprises a target entity and a corresponding anonymized identifier comprising the anonymized identity for the target entity;
  generating an equivalence map, by:
    making a determination that a resource is associated with a subset of the target entities of the plurality of target entities;
    storing, in the equivalence map, an identity relationship specifying that the subset of the target entities is associated with the resource;
an anonymization engine comprising software instructions executing on the at least one computer processor, and enabling the computing system to:
  anonymize user activity, based on the anonymization dictionary previously generated by the activity monitoring engine, by:
    processing the activity record using the anonymization dictionary to obtain an anonymized activity record, by:
      replacing, in the activity record, target entities with their corresponding anonymized identifiers, specified in the anonymization dictionary; and
a repository configured to store the anonymized activity record.

21. A method for processing activity records, the method comprising:
- obtaining a plurality of activity records, wherein each activity record comprises metadata documenting user activity;
- providing at least one of the plurality of activity records to each of a plurality of workers;
- receiving, from each of the plurality of workers, a set of target entities detected in the at least one activity record, wherein each target entity is metadata related to the user activity and requires anonymization;
- generating, using the sets of target entities, an anonymization dictionary, by:
  - making a determination that a resource is associated with a plurality of the target entities, wherein a first target entity is obtained from a first worker of the plurality of workers and the second target entity is obtained from a second worker of the plurality of workers; and
  - assigning anonymized identifiers to the plurality of target entities;
- providing a copy of the anonymization dictionary to each of the plurality of workers;
- receiving, from each of the plurality of workers, at least one anonymized activity record generated using the copy of the anonymization dictionary, wherein in the at least one anonymized activity record, target entities are replaced by the corresponding anonymized identifiers, specified in the anonymization dictionary;
- storing the at least one anonymized activity record.

22. The method of claim 21, further comprising:
- analyzing the at least one anonymized activity record using a threat detection algorithm.

23. The method of claim 21, wherein the plurality of activity records are obtained from a plurality of endpoint agents.

24. A method for processing activity records, the method comprising:
- obtaining a first plurality of anonymized activity records and a first local anonymization dictionary from a first endpoint agent, wherein each of the anonymized activity records comprises at least one anonymized identifier that replaces a target entity, wherein that target entity is metadata related to user activity and requires anonymization;
- obtaining a second plurality of anonymized activity records and a second local anonymization dictionary from a second endpoint agent;
- storing the first plurality of anonymized activity records, the first local anonymization dictionary, the second plurality of anonymized activity records, and the second local anonymization dictionary; and
- performing a threat analysis using the first plurality of anonymized activity records, the first local anonymization dictionary, the second plurality of anonymized activity records, and the second local anonymization dictionary.

* * * * *